(12) United States Patent
Yamasaki et al.

(10) Patent No.: US 8,491,988 B2
(45) Date of Patent: Jul. 23, 2013

(54) MOLDING PRECURSOR, PROCESS FOR PRODUCING MOLDED FIBER-REINFORCED RESIN, AND MOLDED FIBER-REINFORCED RESIN

(75) Inventors: Masaaki Yamasaki, Ehime (JP); Toshihide Sekido, Shiga (JP); Hidehiro Takemoto, Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/584,113

(22) Filed: Aug. 13, 2012

(65) Prior Publication Data

US 2012/0308782 A1 Dec. 6, 2012

Related U.S. Application Data

(62) Division of application No. 11/792,128, filed as application No. PCT/JP2005/022178 on Dec. 2, 2005, now Pat. No. 8,257,823.

(30) Foreign Application Priority Data

Dec. 6, 2004 (JP) .................................. 2004-352628

(51) Int. Cl.
*B32B 7/04* (2006.01)
*B29C 39/10* (2006.01)
*B29C 70/10* (2006.01)

(52) U.S. Cl.
USPC ........... 428/212; 428/220; 428/219; 428/218; 428/304.4; 428/192; 428/297.1

(58) Field of Classification Search
None
See application file for complete search history.

(56) References Cited

U.S. PATENT DOCUMENTS

| | | | |
|---|---|---|---|
| 4,368,234 A | 1/1983 | Palmer et al. | |
| 5,035,602 A | 7/1991 | Johnson | |
| 5,733,494 A | 3/1998 | Moore | |
| 6,231,094 B1 | 5/2001 | Uytterhaeghe et al. | |

FOREIGN PATENT DOCUMENTS

| | | |
|---|---|---|
| JP | 58-162324 A | 9/1983 |
| JP | 1-253412 A | 10/1989 |
| JP | 4-229212 A | 8/1992 |
| JP | 4-257406 A | 9/1992 |
| JP | 2003-25346 A | 1/2003 |
| JP | 2003-80607 A | 3/2003 |
| JP | 2003-127157 A | 5/2003 |
| JP | 2003-305719 A | 10/2003 |
| JP | 2005-231112 A | 9/2005 |
| JP | 2005-324340 A | 11/2005 |

OTHER PUBLICATIONS

"Nomex(R) Type 410 Technical Datasheet". Dupont, (2000), pp. 1-8.*
J.L. Kardos, "Critical issues in achieving desirable mechanical properties for short fiber composites," Pure & Appl. Chem., vol. 57, No. 11, 1985, pp. 1651-1657.

* cited by examiner

*Primary Examiner* — Maria Veronica Ewald
*Assistant Examiner* — Prashant J Khatri
(74) *Attorney, Agent, or Firm* — DLA Piper LLP (US)

(57) ABSTRACT

A process for producing a molded fiber-reinforced resin by an RTM method includes disposing a molding precursor in a molding cavity of a mold; closing the mold in which the molding precursor is disposed; injecting a heated and pressurized resin into the molding cavity of the mold closed; solidifying the resin injected into the molding cavity; opening the mold after the resin has been solidified; and taking out the molded fiber-reinforced resin from the mold opened.

11 Claims, 17 Drawing Sheets

MOLDING PRECURSOR, PROCESS FOR PRODUCING MOLDED FIBER-REINFORCED RESIN, AND MOLDED FIBER-REINFORCED RESIN

RELATED APPLICATIONS

This is a divisional of U.S. patent application Ser. No. 11/792,128, filed Jun. 1, 2007, which is a §371 of International Application No. PCT/JP2005/022178, with an international filing date of Dec. 2, 2005 (WO 2006/062038 A1, published Jun. 15, 2006), which is based on Japanese Patent Application No. 2004-352628, filed Dec. 6, 2004.

TECHNICAL FIELD

This disclosure relates to a molding precursor, a process for producing a molded fiber-reinforced resin obtained by impregnating the molding precursor with a matrix resin by the resin transfer molding (RTM) method, and a molded fiber-reinforced resin. The molding precursor facilitates finishing of the molded fiber-reinforced resin comprising the molding precursor and a resin.

BACKGROUND

Fiber-reinforced plastics (FRP), especially carbon fiber-reinforced plastics (CFRP) are used in various fields as composite materials having light weight and high mechanical properties. As one of methods for producing molded FRP products, known is an RTM method comprising the steps of disposing a reinforcing fiber material in a molding cavity of a mold, closing the mold, injecting a flowable matrix resin into the mold, and heating for hardening or cooling for solidification. In this method, the mold is internally kept at a reduced pressure, as required.

The RTM method is one of the most suitable FRP molding methods that can effectively exhibit the light weight and high mechanical properties as the features of FRP, especially CFRP and can efficiently produce molded products having complicated shapes.

However, for removing dead portions such as strong burrs formed at the outer edge of an obtained molded product, water jet machining, NC machining or the like known is necessary as one of post-processing steps after molding. This increases the man-hours and steps of processing, to raise the cost. Especially in case of CFRP, the reinforcing fibers existing in the burrs formed at the outer edges of the molded product are too hard to allow water jet machining and so hard to necessitate frequent changes of the NC machining tool because of frequent wear. The deburring is one of the steps desired to be avoided.

To avoid the costly deburring work, various proposals are made for shaping the reinforcing fiber base material as near to a desired mold shape as possible (near net shape).

For example, it is proposed to hold a reinforcing fiber base material between upper and lower shaping molds, before disposing the reinforcing fiber base material in a mold, so that the reinforcing fiber base material can have a shape close to that of a molding shape beforehand (JP 2003-305719 A).

Further, it is proposed to apply a thermoplastic resin to a multi-layered reinforcing fiber base material and to shape the base material using a shaping mold with heating, so that the base material can have a desired shape maintained more reliably (JP 2003-080607 A).

Furthermore, it is proposed to arrange a reference line on a mold and to make a marking on a reinforcing fiber base material at a position corresponding to the reference line along a weaving yarn therein, so that the base material can be accurately positioned in the mold (JP 2003-127157 A).

However, if the above-mentioned conventional methods are used to avoid water jet machining or NC machining, etc., it is necessary to prepare a reinforcing fiber base material shaped with a size smaller than that of the intended product shape (molding precursor) before the base material is molded together with a resin, so that when the base material is disposed in a molding cavity, the base material does not protrude from the cavity, lest burrs containing reinforcing fibers should be formed.

For example, as shown in FIG. 1, in the case where a molded fiber-reinforced resin 101 used as a molded thin sheet (thickness: 0.5 to 3 mm) such as a cowl of a motorcycle is produced by the RTM method using a reinforcing fiber base material 102 shaped with a size smaller than that of the cowl shape, resin-rich portions 103 where no base material 102 exists occur at hems E1 and E2 as shown in FIG. 2. In the case where this cowl is given impact by collision, etc., there often arises such a problem that the hems E1 and E2 where the resin-rich portions 103 exist are locally broken by stress concentration.

So that the molded resin product 101 reinforced with the reinforcing fiber base material 102 has a predetermined strength also at the hems, it is necessary that the base material 102 perfectly pervades the hems E1 and E2 of the molded resin product 101. For letting the base material 102 pervade the hems of the molded resin product, a method of accurately shaping a molding precursor 100 comprising the base material 102 before disposing it into a lower mold FM was examined. However, since stitches of a woven fabric comprising reinforcing fibers used as the base material 102 were shifted, the dimensions changed greatly, and it was difficult to obtain the required dimensional accuracy (for example, about ±2 mm). Further, it is possible to accurately adjust the edge of the woven fabric disposed in the lower mold by cutting with scissors or the like, but there arose such problems that the working time became very long and that the quality depended on the skill of each worker.

Thus, it could be advantageous to provide a molding precursor that eliminates the cause of cost hike due to the water jet machining, NC machining or the like for deburring the hems E1 and E2 of the molded fiber-reinforced resin and also eliminates the cause of strength decline due to the formation of the resin-rich portions 103 devoid of the reinforcing fibers 102a. It could also be advantageous to provide a process for producing a molded fiber-reinforced resin by the RTM method using the molding precursor and a molded fiber-reinforced resin.

SUMMARY

Respective modes of the molding precursor, the process for producing a molded fiber-reinforced resin by the RTM method and the molded fiber-reinforced resin, respectively, are stated in the following items (1) through (29):

(1) A molding precursor comprising a main body portion and a burr forming portion continuously extending from the edge of the main body portion outwardly, wherein the main body portion is formed of a first base material comprising numerous reinforcing fibers and a second base material comprising numerous fibers laminated on the first base material at the outer edge portion of the main body portion, the burr forming portion is formed by the second base material extending from the edge of the main body portion outwardly, and clearances among the numerous fibers form passages of a molding resin.

(2) A molding precursor, according to item (1), wherein the first base material is arranged to at least partially cover the second base material positioned at the outer edge portion.

(3) A molding precursor, according to item (1), wherein the first base material is arranged to at least partially hold the second base material positioned at the outer edge portion.

(4) A molding precursor, according to item (1), wherein a surface layer forming base material which forms a surface portion of the first base material is arranged to extend from the edge of the main body portion outwardly and further to cover the second base material positioned at the burr forming portion.

(5) A molding precursor, according to item (1), wherein the main body portion has a third base material comprising numerous reinforcing fibers laminated on the first base material and the second base material, the second base material has a form almost identical with that of the main body portion and is arranged between the first base material and the third base material, and a three-layer structure comprising the first base material, the second base material and the third base material is formed.

(6) A molding precursor, according to item (5), wherein at least either the first base material or the third base material is arranged to extend from the edge of the main body portion outwardly and further to partially cover the second base material positioned at the burr forming portion.

(7) A molding precursor, according to item (5), wherein at least either a surface layer forming base material which forms a surface portion of the first base material or a surface layer forming base material which forms a surface portion of the third base material is arranged to extend from the edge of the main body portion and further to cover the second base material positioned at the burr forming portion.

(8) A molding precursor, according to item (5), wherein a core base material comprising a foam is arranged in contact with the second base material in the main body portion.

(9) A molding precursor, according to item (1), wherein the compressive characteristic value of the second base material is 35% to 80%.

(10) A molding precursor, according to item (1), wherein the unit weight of the first base material is 100 to 1000 g/m$^2$.

(11) A molding precursor, according to item (5), wherein the unit weight of the third base material is 100 to 1000 g/m$^2$.

(12) A molding precursor, according to item (1), wherein the strength of the fibers forming the second base material is lower than the strength of the reinforcing fibers forming the first base material.

(13) A molding precursor, according to item (5), wherein the strength of the fibers forming the second base material is lower than the strength of the reinforcing fibers forming the third base material.

(14) A molding precursor, according to item (1), wherein the second base material is a nonwoven fabric.

(15) A molding precursor, according to item (1), wherein the unit weight of the second base material is 10 to 1500 g/m$^2$.

(16) A process for producing a molded fiber-reinforced resin by an RTM method, which comprises the steps of:

disposing a molding precursor in a molding cavity of a mold;
closing the mold in which the molding precursor is disposed;
injecting a heated and pressurized resin into the molding cavity of the mold closed;
solidifying the resin injected into the molding cavity;
opening the mold after the resin has been solidified; and
taking out the molded fiber-reinforced resin from the mold opened, wherein
(a) a molding precursor as set forth in any one of items (1) through (15) is used as the molding precursor;
(b) a film gate through which the resin injected flows is provided at least partially in the outer circumference of the molding cavity;
(c) in the step of disposing the molding precursor in the molding cavity of the mold, the molding precursor is disposed in the molding cavity of the mold in such a manner that the second base material is positioned at least partially in the film gate; and
(d) the second base material exists at least partially in a burr portion of the resin formed by the film gate.

(17) A process for producing a molded fiber-reinforced resin, according to item (16), wherein a runner communicating with the film gate is provided outside the film gate, and the second base material of the molding precursor is disposed to reach the position of the runner.

(18) A process for producing a molded fiber-reinforced resin, according to item (16), wherein a gate clearance of the film gate is 0.1 to 2.0 mm.

(19) A molded fiber-reinforced resin composed of a matrix resin and a reinforcing fiber base material comprising numerous reinforcing fibers, wherein clearances among the numerous reinforcing fibers are impregnated with the matrix resin, and wherein the reinforcing fiber material is a first base material; a second base material comprising numerous fibers is laminated on the first base material at the outer edge portion of the first base material; the strength of the fibers forming the second base material is lower than the strength of the reinforcing fibers forming the first base material; and clearances among the numerous fibers forming the second base material are also impregnated with the matrix resin.

(20) A molded fiber-reinforced resin, according to item (19), wherein the first base material is disposed to at least partially cover the second base material positioned at the outer edge portion.

(21) A molded fiber-reinforced resin, according to item (19), wherein the first base material is disposed to at least partially hold the second base material positioned at the outer edge portion.

(22) A molded fiber-reinforced resin, according to item (19), wherein a core base material comprising a foam which is covered with the first base material is disposed at the central portion of the first base material.

(23) A molded fiber-reinforced resin, according to item (19), wherein a third base material comprising numerous reinforcing fibers is laminated on the first base material and the second base material, the second base material has a form almost identical with that of the first base material and is disposed between the first base material and the third base material, and a three-layer structure comprising the first base material, the second base material and the third base material is formed.

(24) A molded fiber-reinforced resin, according to item (23), wherein a core base material comprising a foam is disposed in contact with the second base material.

(25) A molded fiber-reinforced resin, according to item (19), wherein the unit weight of the first base material is 100 to 1000 g/m².
(26) A molded fiber-reinforced resin, according to item (23), wherein the unit weight of the third base material is 100 to 1000 g/m².
(27) A molded fiber-reinforced resin, according to item (19), wherein the second base material is a nonwoven fabric.
(28) A molded fiber-reinforced resin, according to item (19), wherein the unit weight of the second base material is 10 to 1500 g/m².
(29) A molded fiber-reinforced resin, according to item (19), wherein the thickness of the outer edge portion is 1.5 to 5 times the thickness of the central portion.

According to the molding precursor, the process for producing a molded fiber-reinforced resin by the RTM method and the molded fiber-reinforced resin, since it is not required that the molding precursor is highly accurately positioned in the mold, the work in the molding process is easy and it does not happen that the products become different in quality from worker to worker. Since the burr portion formed after molding is thin resin burr containing a second base material lower in strength than the main body portion, it is not necessary to apply precise and expensive machining such as water jet machining or NC machining for removing the burr and the burr can be removed by a simple tool. Since the first and second base materials can be disposed reliably also at the hem of the product molded in the molding cavity, a molded fiber-reinforced resin having desired strength and good quality can be obtained. The cost for producing the molded fiber-reinforced resin is low. The molded fiber-reinforced resin can be easily and stably produced.

Figure 1:
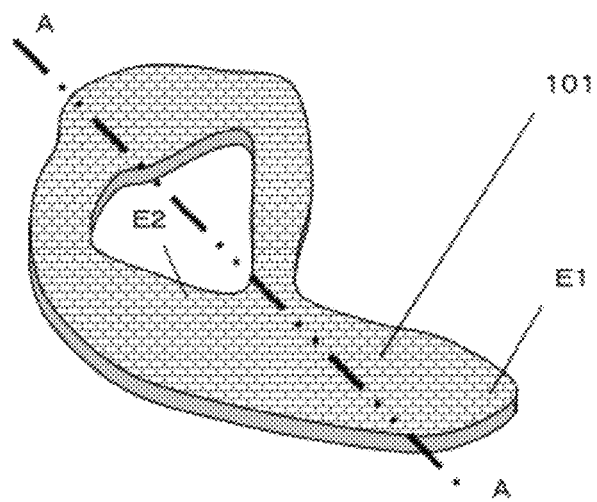
FIG. 1 is a perspective view showing a conventional molded product.

REPRESENTATIVE STRUCTURES FOR REFERENCE NUMBERS 1 mold elevator
2 mold
3 resin injector
4 mixing unit
5 main ingredient tank
6 curing agent tank
7a vacuum pump
7b pressure pump
8a resin injection port
8b resin discharge port
9 hydraulic unit
10 hydraulic pump
11 hydraulic cylinder
12 check valve 13 resin injection passage
14 resin discharge passage
15 resin trap
16 upper mold
17 lower mold
18 film gate
19 runner
20 sealer
22a resin injection valve
22b resin discharge valve
22c controller
23 pressurizing device
24 vacuum pump
25 mold temperature conditioner
26 cavity
31 injected resin pressure gauge
32 mold interior pressure gauge
50 molding precursor
51 cowl of motorcycle
52 first base material
53 second base material
54 FRP portion mainly containing the first base material
55 FRP portion mainly containing the second base material
56 molding precursor
57 molding precursor
58 molding precursor
59 molding precursor
61 upper mold
62 lower shaping mold
63 upper shaping mold
64 upper shaping mold
71 main body portion
72 burr forming portion
101 molded fiber-reinforced resin
102 reinforcing fiber base material
103 resin-rich portion
110 molding precursor
111 first base material
112 second base material
113 third base material
115 upper shaping mold
116 lower shaping mold
200 molding precursor
205 upper shaping mold
206 lower shaping mold
207 first base material
208 second base material
209 third base material
210 core material
300 shaping mold
301 lower shaping mold
302 upper shaping mold
303 lower shaping mold
304 upper shaping mold
305 first base material
306 second base material
307 third base material
308 core material

DETAILED DESCRIPTION

A molded fiber-reinforced resin refers to a molded product comprising a resin (matrix resin) reinforced with reinforcing fibers.

Examples of the reinforcing fibers include inorganic fibers such as carbon fibers, glass fibers and metal fibers and organic fibers such as aramid fibers, polyethylene fibers and polyamide fibers.

Examples of the matrix resin include thermosetting resins such as epoxy resins, unsaturated polyester resins, vinyl ester resins and phenol resins. Thermoplastic resins such as polyamide resins, polyolefin resins, dicyclopentadiene resins, polyurethane resins and polypropylene resins can also be used.

As the matrix resin, suitable is a thermosetting resin having a low viscosity capable of being easily impregnated into the reinforcing fibers or a monomer for reaction injection molding (RIM) capable of forming a thermoplastic resin. Above all, in view of decreasing the heat shrinkage of the molded product to inhibit the occurrence of cracking, preferred are epoxy resins, modified epoxy resins mixed with a thermoplastic resin or rubber ingredient, nylon resins, dicyclopentadiene resins and the like.

The molding precursor comprises a main body portion and burr forming portion. The main body portion refers to a portion forming the main structure of the molded product. The burr forming portion refers to the portion where burr is formed at the joint portion of a closed mold.

For the main body portion, a base material containing usually used reinforcing fibers is used mainly as the first base material, while a material better in cutting capability than the first base material is used mainly as the second base material in the range from the burr forming portion to the outer edge portion of the main body portion adjacent to the burr forming portion.

In this constitution, a molded product having the base material spread to the hem of the molded product and allowing good cutting of the burr and the hem can be obtained. So, the machining such as water jet machining or NC machining for deburring can be avoided.

For application to the RTM method, the molding precursor can be prepared beforehand by shaping the first base material and the second base material using a shaping mold, or the first base material and the second base material can be disposed in a mold, to form the molding precursor in the mold at the time of molding.

The first base material and the third base material refer to base materials comprising numerous reinforcing fibers. The reinforcing fibers can be inorganic fibers such as carbon fibers, glass fibers or metal fibers or organic fibers such as aramid fibers, polyethylene fibers or polyamide fibers as described before. The base materials respectively can be of any mode such as a woven fabric (plain weave, twill weave or satin weave) or nonwoven fabric (chopped fibers or mat), braid, knit fabric and the like.

The base material may contain inserts or parts. The inserts or parts can be selected depending on applications. Examples of the inserts and parts include metallic sheets of steel or aluminum, metallic columns, metallic parts for connection such as metallic bolts, nuts and hinges, aluminum honeycomb core, foam formed of a polymeric material such as polyurethane, polystyrene, polyimide, polyvinyl chloride, polyphenol or acrylic polymer, rubbery material, wood material and the like. Mainly insert parts intended for connection by nailing or tapping, insert parts intended for weight reduction by use hollow structures, insert parts intended for damping of vibration or the like can be preferably used.

It is preferred that the second base material is formed with a material or a fabrication of the material larger in deformability and lower in strength and/or Young's modulus than the first base material. For example, when carbon fibers are used as the material of the first base material, the second base material is formed of oxidized yarns, glass fibers, metal fibers, aramid fibers, polyethylene fibers, polyamide fibers or the like. It is more preferred that the second base material is a material or a fabrication of the material having a strength and/or Young's modulus corresponding to $1/4$ to $3/4$ of the strength and/or Young's modulus of the material or the fabrication of the material of the first base material.

It is also possible to use a material having a high strength grade as the material of the first base material and to use the same material but having a low strength grade as the material of the second base material. Further, materials identical in physical properties but different in unit weight can be used in such a manner that the material having the lower unit weight in fabrication of the material is used as the FRP having a lower strength.

The second base material has a configuration having continuous voids formed therein, and, for example, can be a nonwoven fabric or mat. In view of resin impregnability, the second base material can be a woven fabric, knit fabric, braid, unidirectional fiber bundle or the like having a low unit weight, for example, of preferably 10 to 1500 $g/m^2$, more preferably 10 to 200 $g/m^2$.

The second base material is obtained by combining any of the materials and any of the configurations, and, for example, can be a fiber material obtained by processing reinforcing fibers such as carbon fibers, fireproof yarns, glass fibers, metal fibers, aramid fibers, polyethylene fibers or polyamide fibers into a nonwoven fabric or mat, or a woven fabric, knit fabric, braid or unidirectional fiber bundle respectively having a low unit weight or the like. Other examples include a foam formed of a polymeric material such as polyurethane, polystyrene, polyimide, polyvinyl chloride, polyphenol or acrylic polymer, rubber materials and the like. As the foam, a hard core having an apparent density of 0.05 to 1.0 $g/cm^3$ is desirable for forming the second base material positioned at the outer edge portion of the main body portion.

The mold used for the RTM method is, for example, a metallic mold comprising a combination of an upper mold and a lower mold. The upper mold is installed in a mold elevator (press device). In the lower mold, a molding precursor is disposed. The molding precursor may be prepared by using a shaping mold different from the mold, intended for shaping a base material comprising reinforcing fibers into a shape similar to that of the final product beforehand, so that the molding precursor can be easily accommodated in the mold.

The mold can be made of a material such as FRP, cast steel, structural carbon steel, aluminum alloy, zinc alloy, electrocast nickel or electrocast copper. For mass production, structural carbon steel is suitable in view of rigidity, heat resistance and workability.

Figure 4:
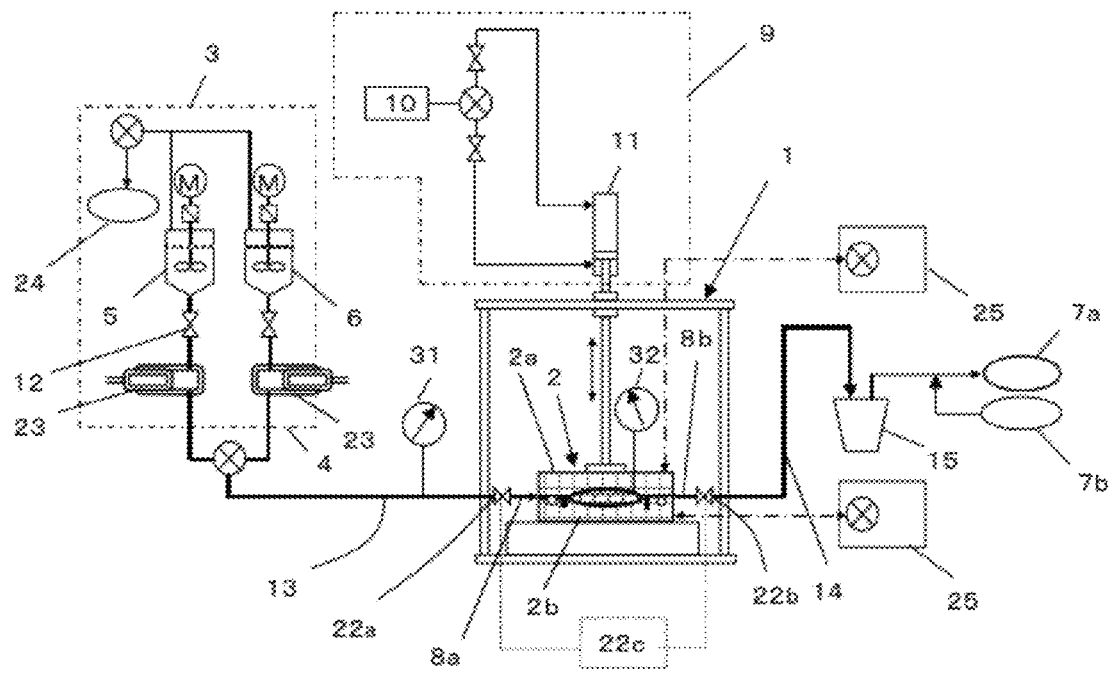
FIG. 4 is a system diagram showing a molding system using an RTM method for producing a molded product.

FIG. 4 is an illustration showing an example of the molding system used for producing the molded fiber-reinforced resin by the RTM method. In FIG. 4, a mold 2 is a metallic mold and comprises an upper mold 2a and a lower mold 2b. The upper mold 2a is installed in a mold elevator 1. The mold elevator 1 has a hydraulic unit 9 with a hydraulic pump 10 and a hydraulic cylinder 11. The elevating operation and the pressurizing operation of the upper mold 2a are controlled by the hydraulic unit 9.

The mold 2 is connected with a resin injection passage 13 through a resin injection port 8a and with a resin discharge passage 14 through a resin discharge port 8b. The resin injection passage 13 is connected with the resin injection port 8a through a resin injection valve 22a, and the resin discharge passage 14 is connected with the resin discharge port 8b through a resin discharge valve 22b. The opening and closing operations and operation timings of the resin injection valve 22a and the resin discharge valve 22b are controlled by the commands from a controller 22c.

The resin injection passage 13 is connected with a resin injector 3. The resin injector 3 has a main ingredient tank 5 containing a main ingredient and a curing agent tank 6 containing a curing agent, and the respective tanks are provided with a heating mechanism. When the resin is injected into the mold 2, the main ingredient and the curing agent are supplied from the respective tanks toward the resin injection passage 13 by pressurizing devices 23. The main ingredient and the curing agent are mixed by a mixing unit 4, to make a molding resin that is fed to the resin injection passage 13. The resin discharge passage 14 is provided with a resin trap 15 for preventing that the resin flows into a vacuum pump 7a.

The number and position of the resin injection port 8a depend on the shape and dimension of the mold 2, the number of products to be molded simultaneously in the mold and the like, but it is preferred that the number of the resin injection port 8a is as small as possible. Further, the number and position of the resin discharge port 8b depend on the shape and dimension of the mold, the number of product molded simultaneously in the mold or the like, but it is preferred that the number of the resin discharge port 8b is also as small as possible.

It is preferred that the resin injection valve 22a installed in the resin injection passage 13 and the resin discharge valve 22b installed in the resin discharge passage 14 are respectively such that a vice grip or the like is used by a worker to directly release or squeeze the passage to totally open or close the passage or to change the bore when the resin is injected.

Figure 15:
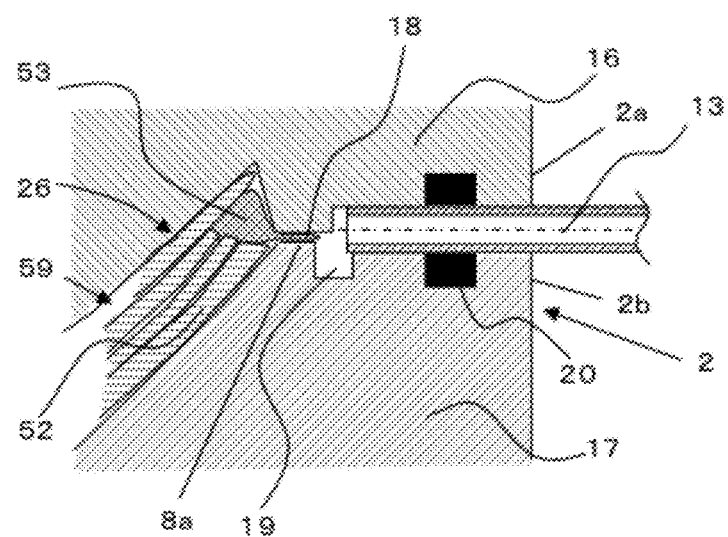
FIG. 15 is a vertical sectional view showing a resin injecting portion of a mold in the molding system of FIG. 4.

FIG. 15 shows the resin injection port 8a of the mold 2 shown in FIG. 4 in detail. In FIG. 15, a sealer 20 is placed entirely around the cavity 26 of the mold 2, and if the upper mold 2a and the lower mold 2b are closed, the cavity 26 is substantially sealed. The resin injected from the resin injection passage 13 is stored in a runner 19. The length of the runner 19 is the same as the width of the cavity 26, and the runner 19 is connected with the cavity 26 through a thin film gate 18.

If the runner 19 is filled with the resin, the resin passes through the film gate 18 and is injected into the cavity 26. If the resin injection port 8a has such a structure, the resin injected from one point is injected along a width of the cavity 26 all at once. Thus, the reinforcing fiber base material accommodated in the cavity 26 is efficiently impregnated with the resin. Meanwhile, though not shown in the drawing, the resin discharge port 8b is also structurally similar to the resin injection port 8a.

The resin is pressurized by the pressurizing devices 23. If pumps capable of quantitatively delivering such as syringe pumps are used as the pressurizing devices 23, the resin can be not only pressurized but also metered. It is preferred that the resin injection pressure Pi is in a range from 0.1 to 1.0 MPa.

Finally if the resin perfectly impregnates into the base material (molding precursor) 59 in the mold 2 and reaches the resin discharge passage 14, the resin discharge passage 14 is closed, and after a while, the resin injection passage 13 is closed, to complete the injection of the resin. The mold 2 is heated, for example, by a mold temperature conditioner 25, and this accelerates the curing of the resin.

In the conventional methods, a reinforcing fiber base material (corresponding to the first base material) adapted to the shape of the mold 2 is disposed in the mold, and the mold is closed. At this moment, the reinforcing fiber base material is partially held between the upper and lower molds. Then, in the state where the resin injection valve 22a is closed, the atmosphere in the mold is evacuated by the vacuum pump 7a through the resin discharge passage 14 communicating with the opened resin discharge valve 22. The resin pressure Pm in the mold is kept in a state of reduced pressure, and in succession, the resin injection valve 22a is opened to supply the resin from the resin injection passage 13 into the mold. The resin is pressure-injected till the mold is perfectly internally filled with the resin, to produce a molded product.

However, the molded product produced as described above has a reinforcing fiber-containing burr, since the reinforcing fiber base material is partially held between the upper and lower molds during molding. For obtaining a commercial product from the molded product, it is necessary to remove the reinforcing fiber-containing burr. So, a molded thin sheet (thickness about 0.5 to 3 mm) requiring accuracy such as a cowl of a motorcycle requires a step of finishing the molded product into a predetermined shape by water jet machining or NC machining.

For avoiding such machining, it is necessary to make a molding precursor smaller than a product shape, to ensure that the molding precursor does not protrude beyond the predetermined product shape, that is, to ensure that the reinforcing fiber base material is not partially held between the upper and lower molds. However, as described before, this method has a problem that the hem is not filled with the reinforcing fiber base material, and in view of the nature of the hem, there is a problem that in the case where the commercial product is given impart by an external force such as collision, the hem is broken.

In our molding precursors, the main body portion is mainly formed of a base material containing usually used reinforcing fibers mainly as a first base material, while a base material comprising a material better in cutting capability than the first base material is used mainly as a second base material in the range from the burr forming portion to the outer edge portion of the main body portion adjacent to the burr forming portion.

Figure 5:
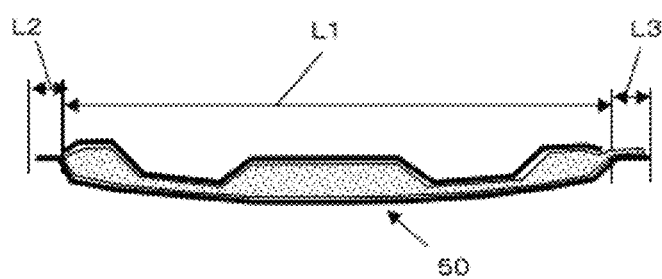
FIG. 5 is a vertical sectional view showing an example of the molding precursor.

An example of the molding precursor is shown in FIG. 5. In FIG. 5, a molding precursor 50 has a fiber structure containing a main body portion L1 and burr forming portions L2 and L3. The main body portion L1 refers to a portion where the main structure of the molded fiber-reinforced resin is formed and the burr forming portions L2 and L3 refer to portions where burrs are positioned at the mold joint portion other than the cavity portion of the tool mold when the tool mold is closed. In the post-processing step of the molded product, the burr portions L2 and L3 are removed to obtain a molded fiber-reinforced resin consisting of the main body portion L1.

An example of the method in which a first base material and a second base material are disposed in a mold, to prepare a molding precursor in the mold is explained below.

At first, prearranged is a first base material somewhat smaller than the product shape (the cavity portion of the mold) to be molded by the RTM method. It is preferred that the size of the first base material is smaller than the product shape by about 3 to about 80 mm. If the size is larger than the range, high positioning accuracy is needed when the first base material is disposed in a shaping mold, to enormously increase the time and labor spent for shaping the molding precursor. If the size is smaller than the range, the portion occupied by the first base material in the molded product is small, and the molded product may not have sufficient strength. It is more preferred that the size of the first base material is smaller than the product shape by 5 to 20 mm. As indicated by the range, since the size setting range is wide, the dimensional accuracy of the first base material can be set in a range wider than the conventional tolerance, and the base material can be easily disposed.

Next, to fill a clearance between the first base material and a shape of the mold, the second base material is disposed to protrude outside the product shape. A part of the second base material is disposed to overlap on a part of the first base material never to form any vacancy where neither the first base material nor the second base material exists. In this case, it is preferred, in view of the strength of the molded product, to dispose the second base material such that the second base material is at least partially held between layers of the reinforcing fiber base material, to form a sandwich structure.

It is preferred that the protrusion length of the second base material outside the product shape is more than 1 mm to less than 50 mm from the edge of the cavity. If the protrusion length is 50 mm or more, the amount of the second base material held between the upper and lower molds is too large to close the mold or so large that it takes a long time to reduce the pressure in the mold to 0.01 MPa or less. If the protrusion length is 1 mm or less, high accuracy is required to position the molding precursor in the mold, taking a long time for the work. A more preferred protrusion length is more than 1 mm to 15 mm.

It is preferred that the unit weight of the second base material is 10 to 1500 $g/m^2$, though depending on the thickness of the mold shape. If the unit weight of the second base material is more than 1500 $g/m^2$, the amount of the second base material held by the mold is too large to close the mold or so large as to take a long time for reducing the pressure in the mold to 0.01 MPa or less. If the unit weight of the second base material is less than 10 $g/m^2$, the vacancy in the mold cannot be filled, and resin-rich portions may be formed in the molded product.

A part of the first base material can also be made to cover the second base material and further be protruded outside the mold shape. If a surface layer forming a surface portion of the first base material, positioned on the surface side of the molding precursor, is made to cover the second base material and is further protruded to the burr forming portions, the second base material is not exposed on a surface of the molded product, and the molded product obtained can have good appearance. In this case, the surface layer forming the surface portion of the first base material is a one- to three-ply fiber sheet.

It is preferred that the unit weight of the surface layer forming the surface portion of the first base material is 100 to 1000 $g/m^2$. If the unit weight of the surface layer is less than 100 $g/m^2$, it may not be able to cover the second base material and the second base material may be exposed on the surface. If the unit weight of the surface layer is more than 1000 $g/m^2$, strong burrs are formed when the molded product is produced, and deburring is difficult. For obtaining a molded product having good surface appearance and allowing easy deburring, it is more preferred that the unit weight of the surface layer is 150 to 350 $g/m^2$.

The portion where the second base material is applied is not limited to the outer edge portion of the molding precursor. For example, the second base material can be applied by a similar method to a place where a uniform fiber volume content Vf cannot be obtained by the reinforcing fiber base material only, such as an abruptly thinning member, a portion abruptly increasing in wall thickness, a corner or round shape where a base material sheet such as a woven fabric cannot be smoothly shaped or where the reinforcing fiber base material cannot be smoothly packed, or as a reinforcement of a three-dimensionally curved surface having numerous cuts.

Figure 6:
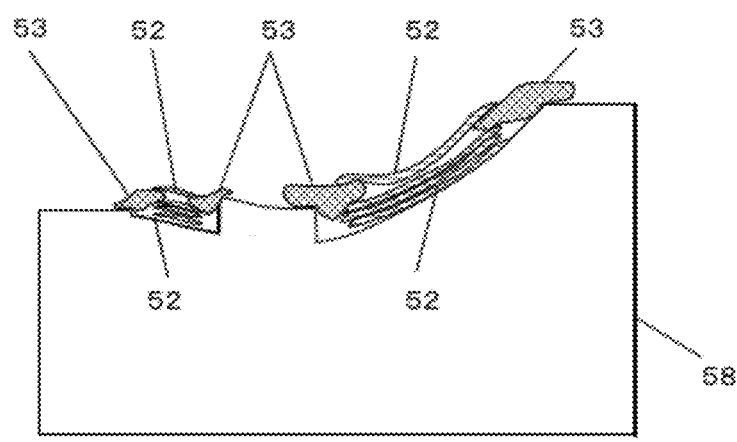
FIG. 6 is a vertical sectional view showing a shaping mold used for preparing another example of the molding precursor.
Figure 7:
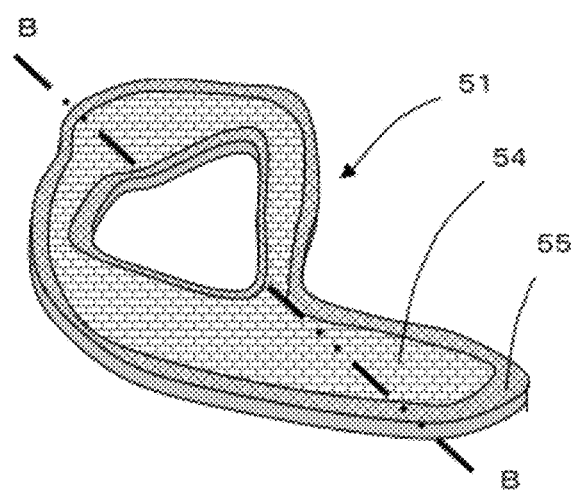
FIG. 7 is a perspective view showing an example of the molded product.
Figure 8:
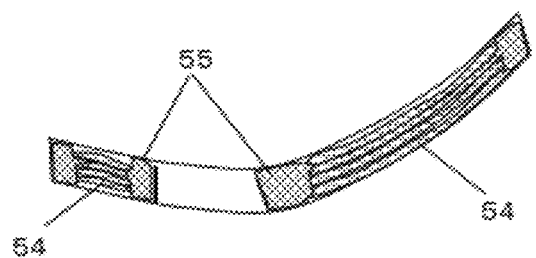
FIG. 8 is the B-B sectional view of the molded product of FIG. 7.

An example where a precursor is applied to the production of a motorcycle cowl is explained below in reference to FIGS. 6, 7 and 8. FIG. 7 is a perspective view of a molded FRP product produced as a cowl 51. The cowl 51 is produced by disposing a first base material 52 formed of a laminated woven fabric sheet smaller than the cowl shape as shown in FIG. 6, disposing a second base material 53 formed of a nonwoven fabric of a material lower in strength than the reinforcing fibers of the first base material around the first base material 52, injecting a matrix resin to impregnate it into the base materials, and molding an FRP portion 54 and an FRP portion 55 integrally.

Figure 25:
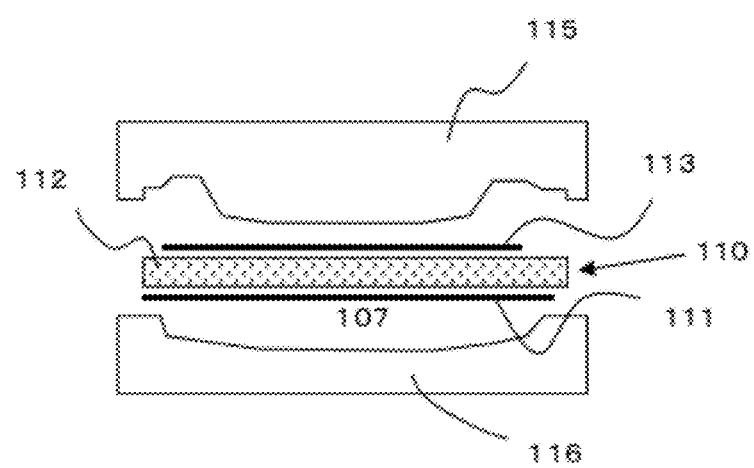
FIG. 25 is a vertical sectional view showing a shaping mold used for preparing a further other example of the molding precursor.

Another example is shown in FIG. 25. In FIG. 25, a molding precursor 110 held between an upper mold 115 and a lower mold 116 comprises a first base material 111, a second base material 112 and a third base material 113, and has a three-layer structure in which the second base material 112 is held between the first base material 111 and the third base material 113.

In this case, it is preferred that the second base material is made of a material or a fabrication of the material larger in deformability and lower in strength and/or Young's modulus than that of the third base material. For example, when the third base material is formed of carbon fibers, the second base material is formed of oxidized yarns, glass fibers, metal fibers, aramid fibers, polyethylene fibers, polyamide fibers or the like. It is more preferred that the second base material is made of a material or a fabrication of the material having a strength and/or Young's modulus corresponding to ¼ to ¾ of the strength and/or Young's modulus of the material or the fabrication of the material of the third base material.

In this case, it is preferred that the compressive characteristic value of the second base material 112 is 20% to 90%. A more preferred range is 35% to 80%. If the compressive characteristic value is in this range, the property of following the change in the thickness of the molded product relating to the main body portion as a whole and the high demand for the capability to form a three-dimensional shape can be satisfied. The second base material 112 can be disposed almost in the entire plane of the molded product or can be disposed to limited necessary portions for obtaining a lighter weight. The compressive characteristic value range of the second base material is also a preferred value range for the second base material in a molding precursor comprising the first base material and the second base material.

The compressive characteristic value refers to a value expressing the deformation degree of a base material in the thickness direction in the case where a predetermined load is applied to the base material in the thickness direction, and can be measured as described below.

Figure 26:
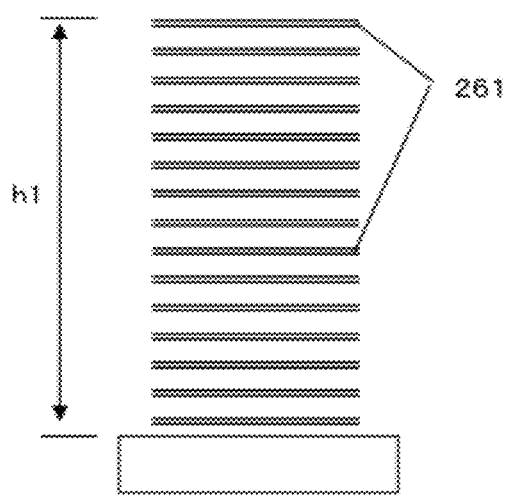
FIG. 26 is a schematic front view showing an instrument for measuring the compressive characteristic value of a second base material used in the molding precursor.
Figure 27:
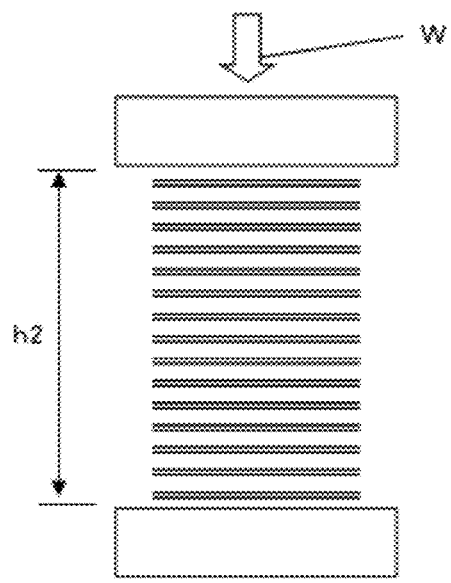
FIG. 27 is a schematic front view showing a state where a load is applied to the second base material in the instrument of FIG. 26.

As shown in FIG. 26, a base material 261 to be evaluated is cut into 50±3 mm squares, and plural sheets of them are stacked to have a thickness of 20 mm±5 mm. The height h1 of the base material stack is measured. Then, as shown in FIG. 27, a load W of 200 g is applied for compressing the stack, and the height h2 of the base material stack in this case is measured. The heights h1 and h2 obtained like this are used to calculate the compressive characteristic value R from the following formula:

$$R = (h1 - h2)/h1 \times 100 (\%).$$

Figure 28:
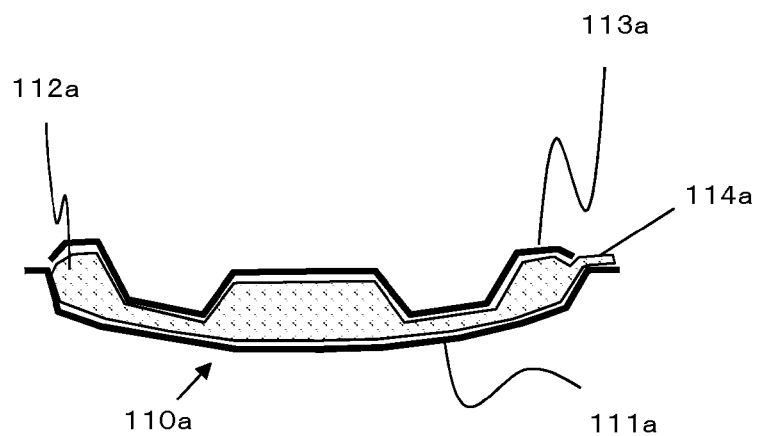
FIG. 28 is a vertical sectional view showing a further other example of the molding precursor.

FIG. 28 shows a further example of a molding precursor. In FIG. 28, a molding precursor 110a comprises a first base material 111a, a second base material 112a and a third base material 113a, and the second base material 112a occupies a great portion of the main body portion like the first base material 111a and the third base material 113a. In this molding precursor 110a, it is desirable that at least one base material of the first, second and third base materials extends to burr forming portions 114a. It is more preferred in view of keeping the appearance of the molded product continuous that the first base material 111a or the third base material 113a considerably covers the second base material 112a in the burr forming portions 114a.

In view of material efficiency, it is preferred that the extending length of the base material to the burr forming portions 114a is 3 to 100 mm from the hem of the main body portion. A range from 5 to 30 mm is more preferred. In view of the arrangement of base materials, it is preferred the non-extending base material has its hem positioned at 3 to 80 mm inward from the hem of the main body portion. A more preferred range is 5 to 20 mm.

Figure 30:
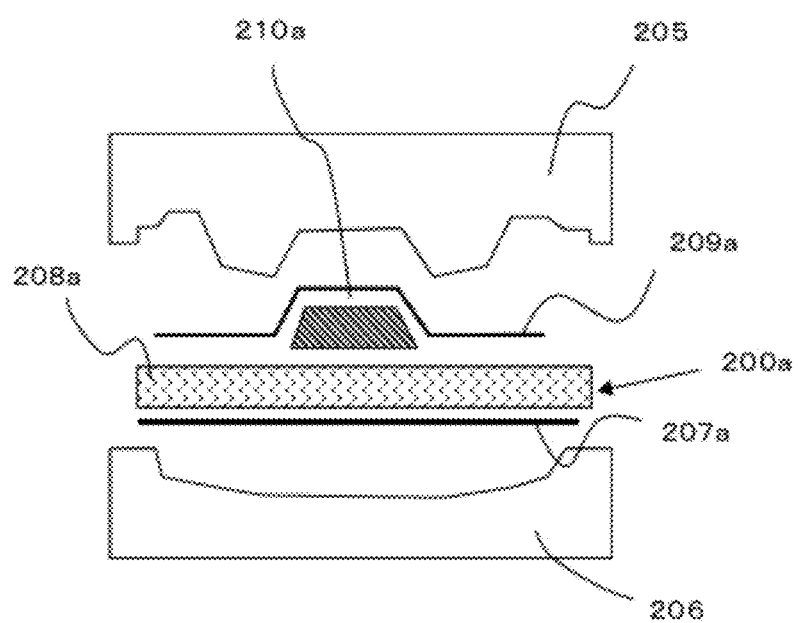
FIG. 30 is a vertical sectional view showing a shaping mold used for preparing a further other example of the molding precursor.
Figure 31:
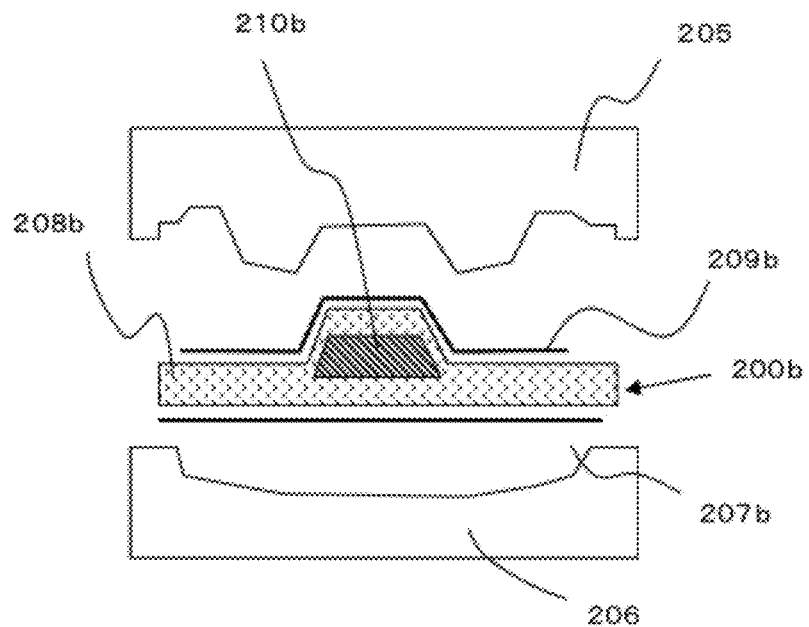
FIG. 31 is a vertical sectional view showing a shaping mold used for preparing a further other example of the molding precursor.

Cases where a core is used in the molded product are explained below in reference to FIGS. 29, 30 and 31. In the case where a core is used, it is necessary that the molding precursor held between the upper mold and the lower mold has a portion of a three-layer structure where a second base material is held between a first base material and a third base material.

Figure 29:
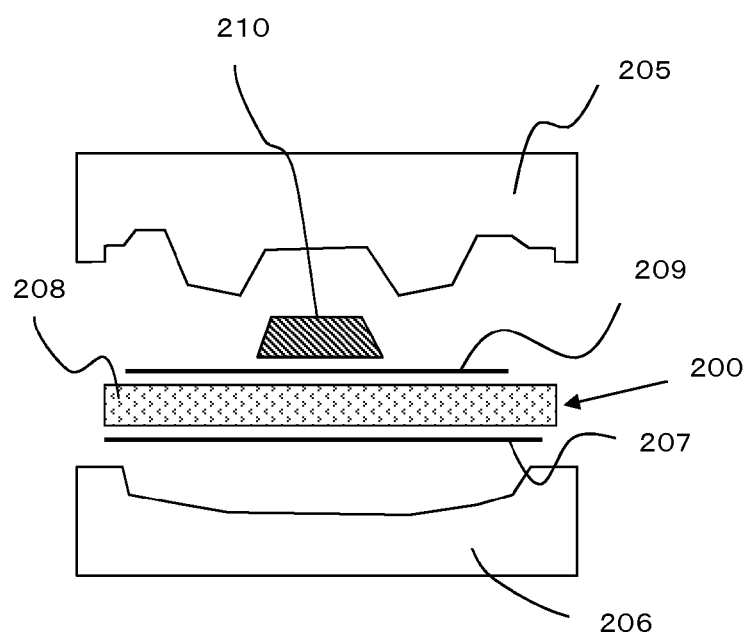
FIG. 29 is a vertical sectional view showing a shaping mold used for preparing a further other example of the molding precursor.

FIG. 29 shows a case where a core 210 is disposed outside the molding precursor 200. It is preferred that the second base material 208 is disposed to exist around the core 210. FIG. 30 shows a case where the core 210a is disposed in contact with the second base material 208a of the molding precursor 200a. In this case, it can be ensured that the core 210a is not exposed from the molded product. FIG. 31 shows a case where a core 210b is disposed inside the second base material 208b of the molding precursor 200b. The core 210b can also be covered with the second base material 208b.

In view of obtaining a molded product having good appearance, it is preferred that the thickness ratio Tt obtained from formula Tt=(T1+T3)/T2, where T1 is the thickness of the first base material; T2 is the thickness of the second base material; and T3 is the thickness of the third base material, is 10 or less in the main body portion.

More particular examples and comparative examples are described below.

The base materials used in the examples and the comparative examples are as follows:

Base Material B1:
  Woven fabric of carbon fibers, CO6343B produced by Toray Industries, Inc.
  Weave structure: plain weave, unit weight of woven fabric: 198 g/m², reinforcing fibers: T300B-3K, elastic modulus: 230 GPa, strength: 3530 MPa, fineness: 198 tex, and number of filaments: 3000.

Base Material B2:
  Woven fabric of carbon fibers, BT70-30 produced by Toray Industries, Inc.
  Weave structure: plain weave, unit weight of woven fabric: 317 g/m², reinforcing fibers: T700SC-12K, elastic modulus: 230 GPa, strength: 4900 MPa, fineness: 800 tex, and number of filaments: 12000.

Base Material B3:
  Oxidized nonwoven fabric, "Lastan" (registered trademark) TOP 8300 produced by Asahi Kasei Corp.
  Fabric configuration: Felt-like nonwoven fabric, and unit weight: 300 g/m².

Base Material B4:
  Glass fiber surface mat, MF30P100BS6 produced by Nitto Boseki Co., Ltd.
  Fabric configuration: Nonwoven fabric of continuous fibers, and unit weight: 30 g/m².

Base Material B5:
Mat of short carbon fibers, "Torayca" (registered trademark) T700SC produced by Toray Industries, Inc.
Elastic modulus: 230 GPa, strength: 4900 MPa, fineness: 1650 tex, length of short fibers: Max 2 inches, and unit weight: 80 g/m$^2$.

Base Material B6:
Mat of continuous strands, produced by Nippon Sheet Glass Co., Ltd.
Fabric configuration: Nonwoven fabric of continuous glass fibers, and unit weight: 450 g/m$^2$.

Base Material B7:
Nonwoven fabric of oxidized yarns, Carbon Felt 50CF produced by Trusco Nakayama Corp.
Fabric configuration: Felt-like nonwoven fabric, and unit weight: 680 g/m$^2$.

Base Material B8:
Nonwoven fabric of glass fibers, Super Wool Mat YWN-8 produced by Yazawa Industry Co., Ltd.
Fabric configuration: felt-like nonwoven fabric, and unit weight: 720 g/m$^2$.

Base Material B11:
A base material obtained by depositing 10±3 g/m$^2$ of a resin having a melting point of 71° C. (epoxy-modified thermoplastic resin) on the base material B1.

Base Material B21:
A base material obtained by depositing 5±3 g/m$^2$ of a resin having a melting point of 71° C. (epoxy-modified thermoplastic resin) on the base material B2.

Core C1:
A foam made of a heat-resistant acrylic resin, Foamac HR #1006 produced by Sekisui Chemical Co., Ltd.
Density: 0.1 g/cm$^3$, and thickness: 6 mm.

Resin MR1:
Epoxy resin, TR-C35 produced by Toray Industries, Inc.
Main ingredient: Epoxy resin, "Epikote" 828 produced by Yuka Shell Epoxy K.K.
Curing agent: Imidazole derivative, Blend TR-C35H produced by Toray Industries, Inc.
Mixing ratio: Main ingredient/curing agent=10/1

Example 1

The molding system explained using FIG. 4 and the molding method explained using FIG. 6 were used to produce a cowl of a motorcycle having an overall length of about 600 mm explained using FIGS. 7 and 8 according to the procedure explained below. The produced cowl had excellent strength and rigidity as a whole and did not have any broken portion.

As the first base material 52, four sheets of the base material B1 cut to be smaller than the mold shape by about 5 mm in width on each side were prepared. Of the four sheets of the base material B1, three sheets were overlaid and disposed in the lower shaping mold 58 shown in FIG. 6. As the second base material 53, the base material B3 was disposed to fill the vacancies between the first base material 52 and the mold shape and further to protrude outward from the ridgelines of the mold by about 5 mm each on the whole. Then, the remaining one sheet of the base material B1 was overlapped on it.

To adapt the first base material 52 to the shape of the lower shaping mold 58, a thermoplastic adhesive material (epoxy-modified thermoplastic resin, melting point 71° C.) had been applied to the first base material 52 beforehand.

Figure 16:
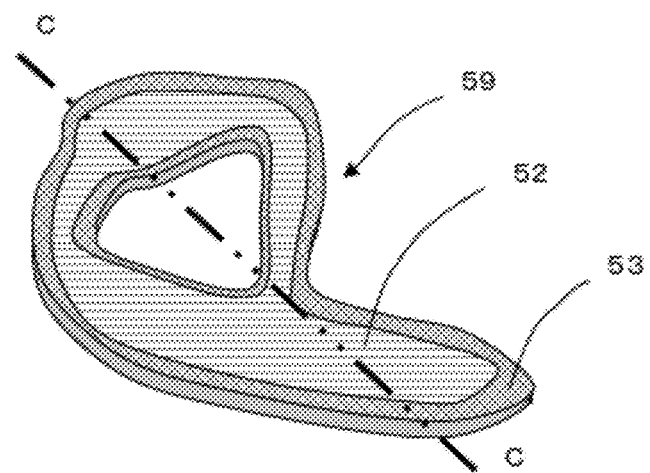
FIG. 16 is a perspective view showing a further other example of the molding precursor.
Figure 17:
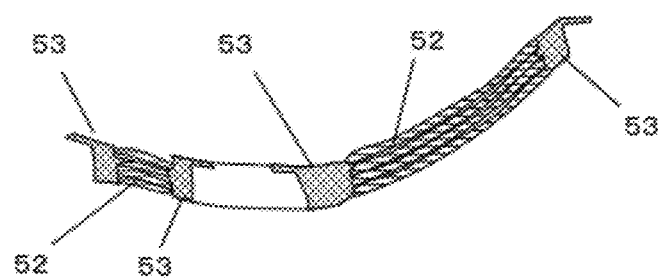
FIG. 17 is the C-C sectional view of the molding precursor of FIG. 16.

The upper shaping mold not shown in the drawing was brought into contact with the lower shaping mold 58, and while the base materials were adapted to the shape of the shaping mold, the shaping mold was heated to a temperature of 90° C., and kept in the state for about 10 minutes. Then, the shaping mold was quickly cooled, and the base materials were taken out of the shaping mold. A molding precursor 59 in which the four sheets of the base material B1 as the first base material 52 and the base material B3 as the second base material 53 were integrated is shown in FIGS. 16 and 17.

Figure 13:
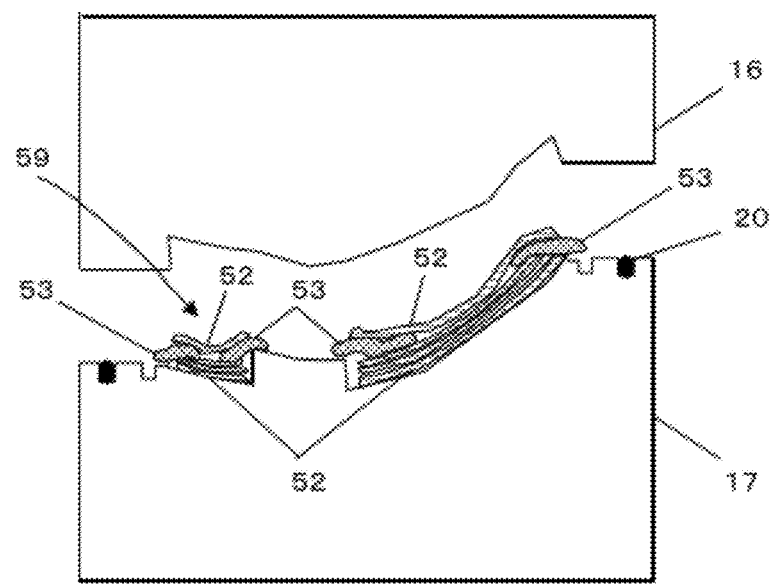
FIG. 13 is a vertical sectional view showing a mold used for producing a further other example of the molded product.
Figure 14:
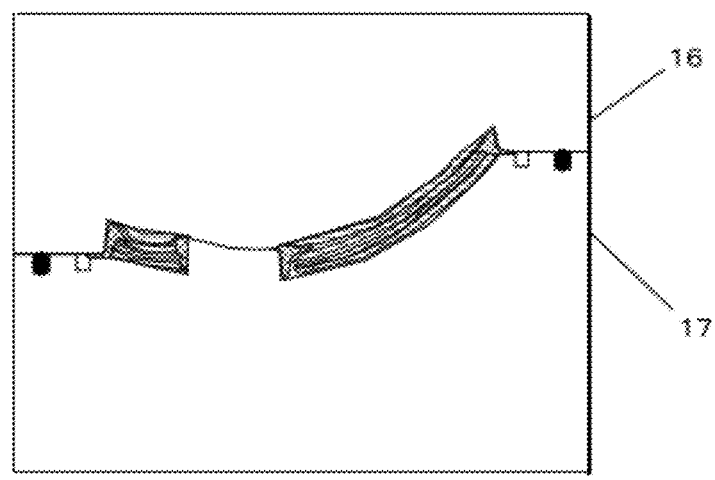
FIG. 14 is a vertical sectional view showing a state where the mold of FIG. 13 is closed.

The obtained molding precursor 59 was disposed in the lower mold 17 as shown in FIG. 13. The molding precursor 59 was disposed in such a manner that the edges of the second base material 53 of the molding precursor 59 protruded from the ridgelines of the molding cavity by 3 mm or more. Then, both the upper mold 16 and the lower mold 17 were kept at a temperature of 100° C. by the temperature conditioner not shown in the drawing. Subsequently, as shown in FIG. 14, the upper mold 16 was lowered to be kept in contact with the lower mold 17, in such a manner that the second base material 53 was partially held between the upper mold 16 and the lower mold 17. Since the base material B3 could be deformed greatly and crushed thinly when held between the upper and lower molds, the mold could be closed for sealing without any problem.

Then, the resin injection passage 13 was connected with the resin injection port 8a of the molding system shown in FIG. 4, and the resin discharge passage 14 was connected with the resin discharge port 8b. The resin injection passage 13 and the resin discharge passage 14 were respectively a "Teflon" (registered trademark) tube having a diameter of 12 mm and a wall thickness of 2 mm. The resin discharge passage 14 was provided with the resin trap 15 to prevent that the resin flowed into the vacuum pump 7a.

To keep the mold internally sealed, the sealer 20 was arranged in the outer circumferential portion of the mold. It is ideal that when the upper mold 16 is closed, the inside of the mold does not communicate with outside in the other portions than the resin injection passage 13 and the resin discharge passage 14. However, perfect sealing is substantially difficult. In the state where the resin injection valve 22a of the resin injection passage 13 was closed while the resin discharge valve 22b was opened, the pressure of a vacuum pressure gauge (not shown in the drawing) was monitored, and if the pressure in the mold was kept at 0.01 mPa for 10 seconds after the vacuum pump 7a was stopped, it was judged that the sealed state of the mold did not pose any problem for molding.

The air in the mold was sucked through the resin discharge port 8b by the vacuum pump 7a, and it was confirmed by the vacuum pressure gauge 32 that the pressure in the mold became 0.01 MPa or less. Then, the pressurizing devices 23 were actuated to start resin injection into the mold. As the pressurizing devices 23, syringe pumps were used. Arrangement was made to prevent the back flow of the resin toward the tanks 5 and 6 while the resin was injected.

As the resin, resin MR1 (liquid epoxy resin) was used. In the resin injector 3, the main ingredient in the main ingredient tank 5 and the curing agent in the curing agent tank 6 were respectively heated to 40° C. with stirring beforehand, to be lowered in viscosity to predetermined values and defoamed by the vacuum pump 24.

In the beginning of resin injection, since the air in the resin mixing unit 4 and the air in the hoses went into the resin, the resin was not fed into the mold, but was thrown away through a branch line not shown in the drawing. The pressurizing devices 23 were set at 200 g/stroke.

After the resin in the beginning was thrown away, the resin injection pressure (pressure 0.6 MPa in this example) was confirmed in reference to the resin injection pressure gauge 31 installed in the resin injection passage 13, and the resin injection valve 22a was opened to inject the resin into the mold. When the resin injection was started, the resin discharge passage 14 was kept opened. If the relation of Pm<Pi, where the internal pressure of the mold (the resin pressure in the mold) is Pm and the resin injection pressure is Pi, is satisfied in this case, the resin can be easily injected into the mold.

After the mold was internally filled with the resin, the resin discharge passage 14 was closed, and the resin injection was continued for 1 minute to ensure that if a gas remained in the resin in the worst case, the gas could be crushed by keeping the resin injection pressure Pi equal to the resin pressure Pm in the mold. Further one minute later, the resin injection passage 13 was closed to terminate the resin injection. In this state, the resin was allowed to stand for 40 minutes, to be cured.

Then, the molded product was taken out of the mold. Around the molded product, thin burrs comprising the base material B3 and the epoxy resin were formed. Since the burrs were an FRP comprising the second base material and the resin, hence having a low strength, the burrs were removed by a simple deburring tool and a sanding tool. The burrs could be easily removed by about 1 minute of work. A large-scale equipment for water jet machining, NC machining or the like was not necessary, and a simple deburring tool could be used for finishing the molded product.

Example 2

A molded product was produced according to the same method as that of Example 1, except that the base material B4 was used as the second base material. Around the obtained molded product, thin burrs comprising the base material B4 and the epoxy resin were formed.

The burrs were removed by a simple deburring tool and a sanding tool. The deburring was completed in about 1 minute and 30 seconds, and the burrs could be removed easily. A large-scale equipment for water jet machining, NC machining or the like was not necessary, and a simple deburring tool could be used for finishing the molded product.

Example 3

A molded product was produced according to the same method as that of Example 1, except that the base material B2 was used as the first base material and that the base material B5 was used as the second base material. Around the obtained molded product, thin burrs comprising the base material B5 and the epoxy resin were formed.

The burrs were removed by a simple deburring tool and a sanding tool. The deburring was completed in about 2 minutes, and the burrs could be easily removed. A large-scale equipment for water jet machining, NC machining or the like was not necessary, and a simple deburring tool could be used for finishing the molded product.

Example 4

A molded product was produced according to the same method as that of Example 1, except that the base material B6 was used as the second base material. Around the obtained molded product, thin burrs comprising the base material B6 and the epoxy resin were formed.

The burrs were removed by a simple deburring tool and a sanding tool. The deburring was completed in about 1 minute, and the burrs could be removed easily. A large-scale equipment for water jet machining, NC machining or the like was not necessary, and a simple deburring tool could be used for finishing the molded product.

Example 5

Figure 9:
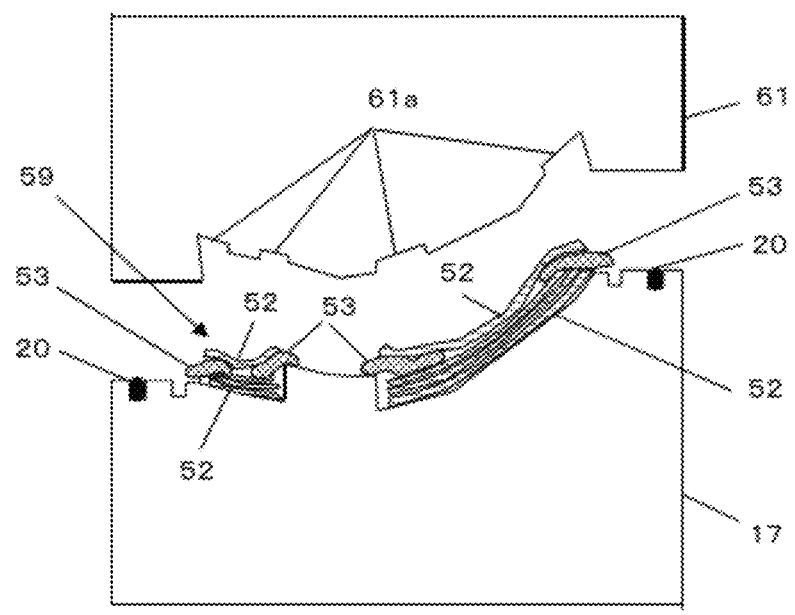
FIG. 9 is a vertical sectional view showing a mold used for producing another example of the molded product.
Figure 10:
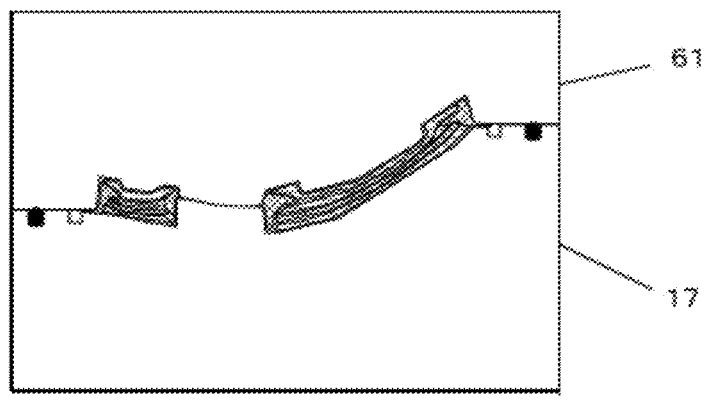
FIG. 10 is a vertical sectional view showing a state where the mold of FIG. 9 is closed.

A molded product was produced according to the same method as that of Example 1, except that the upper mold 61 having recesses 61a for forming thick hems shown in FIGS. 9 and 10 was used as the upper mold. Even when the upper mold 61 and the lower mold 17 were brought into contact with each other, the second base material positioned in the recesses 61a of the cavity were not crushed and shaped in conformity with the shape of the mold, and thick hems could be formed without requiring any additional processing step.

Example 6

Figure 11:
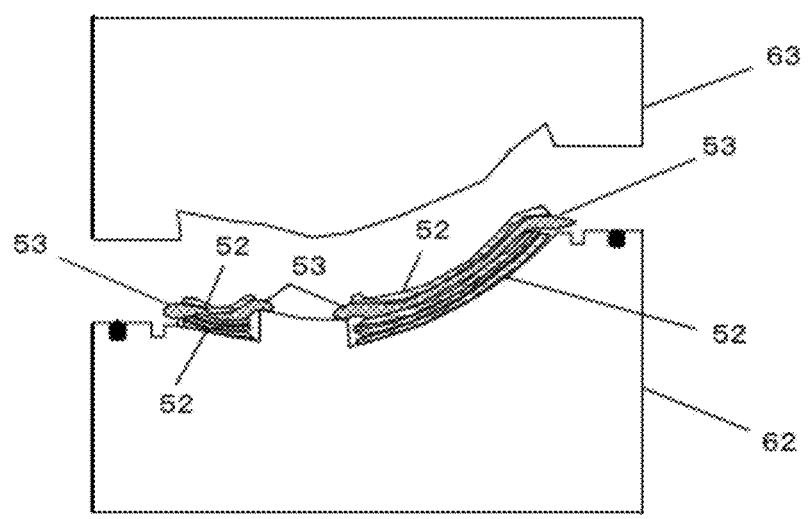
FIG. 11 is a vertical sectional view showing a shaping mold used for preparing a further other example of the molding precursor.

As shown in FIG. 11, four sheets of the base material B1 cut to be smaller than the mold shape in width by about 5 mm on each side were prepared as the first base material 52. Of the four sheets of the base material B1, three sheets were overlaid and disposed in the lower shaping mold 62. As the second base material 53, the base material B3 cut to be larger than the mold shape in width by 5 mm on the whole was used. On the first base material 52, the second base material was overlapped to protrude from the ridgelines of the mold to outside by 5 mm each on the whole. Then, on it, the remaining one sheet of the base material B1 was overlaid.

For adapting the first base material 52 to the shape of the lower shaping mold 62, a thermoplastic adhesive (epoxy-modified thermoplastic resin, melting point 71° C.) had been applied to the first base material 52 beforehand.

Figure 12:
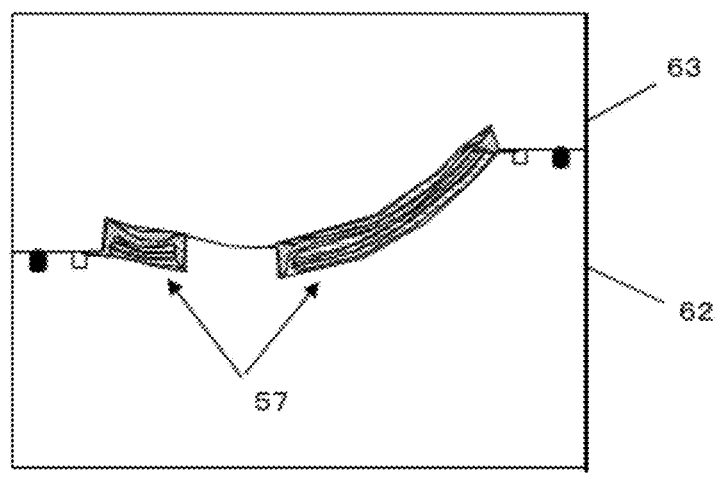
FIG. 12 is a vertical sectional view showing a state where the shaping mold of FIG. 11 is closed.

The upper shaping mold 63 was brought into contact with the lower shaping mold 62, and while the base materials were adapted to the shape of the mold, the shaping mold was heated to a temperature of 90° C. and kept in the state for about 10 minutes. Then, the shaping mold was quickly cooled, and the base materials were taken out of the shaping mold. The molding precursor 57 obtained here, in which the first base material 52 comprising four sheets of the base material B1 and the second base material comprising one sheet of the base material B3, is shown in FIG. 12.

A molded product was produced according to the same method as that of Example 1, except that the obtained molding precursor 57 was used. Around the obtained molded product, thin burrs comprising the base material B3 and the epoxy resin were formed.

The burrs were removed by a simple deburring tool and a sanding tool. The deburring was completed in about 1 minute, and the burrs could be removed easily. A large-scale equipment for water jet machining, NC machining or the like was not necessary, and a simple deburring tool could be used for finishing the molded product.

In the case where the molding precursor was prepared by this method, since there was no trouble of disposing the second base material near the outer edge portion of the cavity, the time for preparing the molding precursor could be greatly shortened.

Example 7

Figure 23:
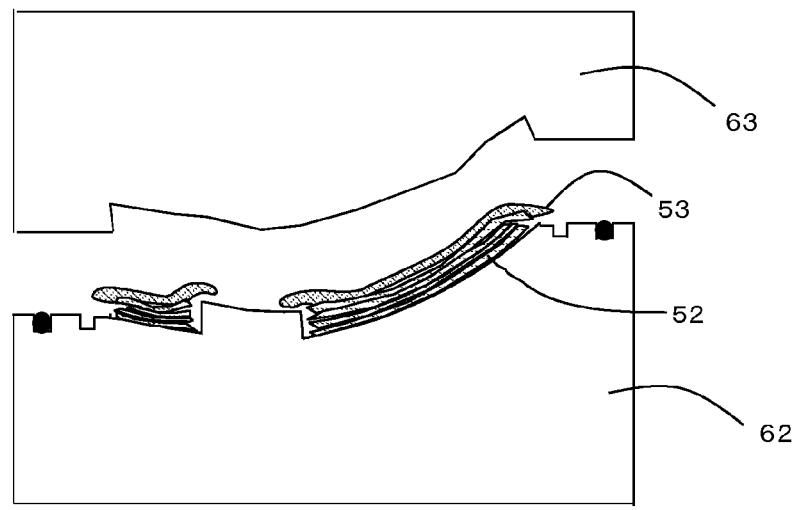
FIG. 23 is a vertical sectional view showing a shaping mold used for preparing a further other example of the molding precursor.

As shown in FIG. 23, four sheets of the base material B2 cut to be smaller than the mold shape in width by about 5 mm on each side were prepared as the first base material 52. The four sheets of the base material B2 were overlaid and disposed in the lower shaping mold 62. As the second base material 53, the base material B3 was disposed to overlie on the first base material 52, in such a manner that it filled the vacancies between the first base material 52 and the cavity and also protruded from the ridgelines of the mold by 5 mm each to outside on the whole.

To adapt the first base material 52 to the shape of the lower shaping mold 62, a thermoplastic adhesive (epoxy-modified thermoplastic resin, melting point 71° C.) had been applied to the first base material 52 beforehand.

Figure 24:
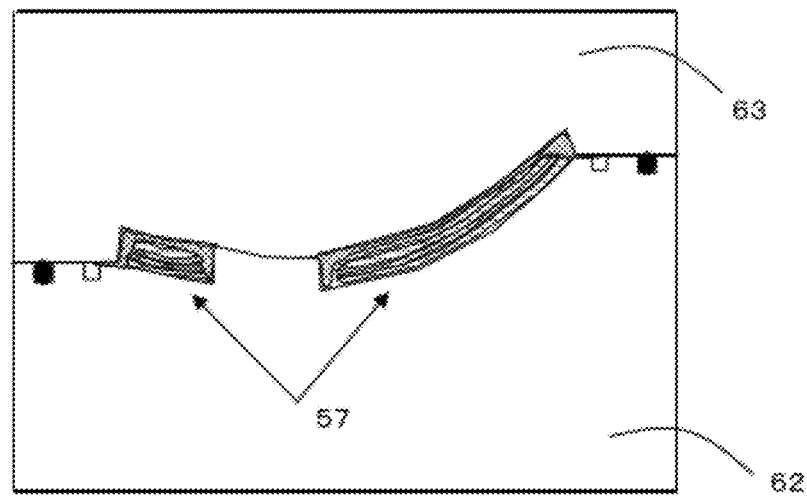
FIG. 24 is a vertical sectional view showing a state where the shaping mold of FIG. 23 is closed.

The upper shaping mold 63 was brought into contact with the lower shaping mold 62, and while the base materials were adapted to the shape of the mold, the shaping mold was heated to a temperature of 90° C. and kept in the state for about 10 minutes. Then, the shaping mold was quickly cooled, and the base materials were taken out of the shaping mold. The molding precursor 57 obtained here, in which the first base material 52 comprising four sheets of the base material B2 and the second base material 53 comprising one sheet of the base material B3 were integrated, is shown in FIG. 24.

A molded product was produced according to the same method as that of Example 1, except that the obtained molding precursor 57 was used. Around the obtained molded product, thin burrs comprising the base material B3 and the epoxy resin were formed.

The burrs were removed by a simple deburring tool and a sanding tool. The deburring was completed in about 1 minute, and the burrs could be removed easily. A large-scale equipment for water jet machining, NC machining or the like was not necessary, and a simple deburring tool could be used for finishing the molded product.

In the case where the molding precursor was prepared by this method, since there was no trouble of holding the second base material between sheets of the first base material, the time for preparing the molding precursor could be greatly shortened.

Example 8

A molded product was produced according to the same method as that of Example 1, except that the base material B7 was used as the second base material. Around the obtained molded product, thin burrs comprising the base material B7 and the epoxy resin were formed.

The burrs were removed by a simple deburring tool and a sanding tool. The deburring was completed in about 1 minute, and the burrs could be removed easily. A large-scale equipment for water jet machining, NC machining or the like was not necessary, and a simple deburring tool could be used for finishing the molded product.

Example 9

A molded product was produced according to the same method as that of Example 1, except that the base material B8 was used as the second base material. Around the obtained molded product, thin burrs comprising the base material B8 and the epoxy resin were formed.

The burrs were removed by a simple deburring tool and a sanding tool. The deburring was completed in about 1 minute and 30 seconds, and the burrs could be removed easily. A large-scale equipment for water jet machining, NC machining or the like was not necessary, and a simple deburring tool could be used for finishing the molded product.

Example 10

Figure 18:
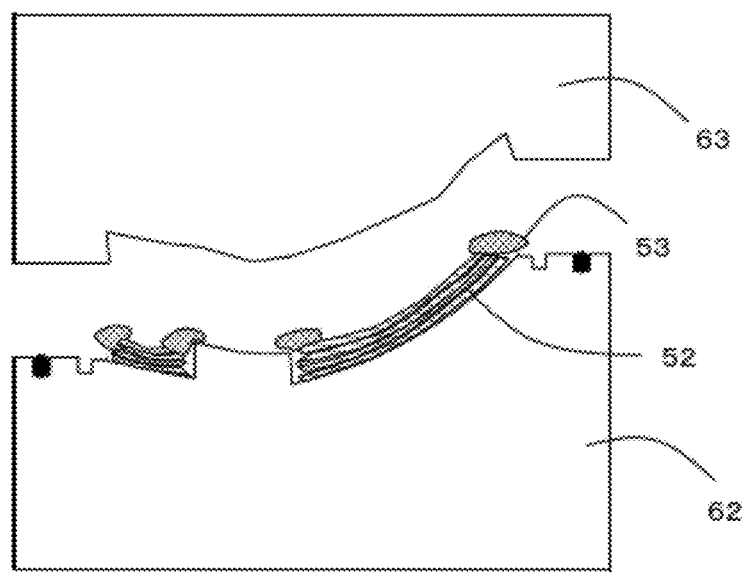
FIG. 18 is a vertical sectional view showing a shaping mold used for preparing a further other example of the molding precursor.

As shown in FIG. 18, four sheets of the base material B2 cut to be smaller than the mold shape in width by about 5 mm on each side were prepared as the first base material 52. The four sheets of the base material B2 were overlaid and disposed in the lower shaping mold 62. As the second base material 53, the base material B3 was disposed to overlie on the first base material 52, in such a manner that it filled the vacancies between the first base material 52 and the mold shape and also protruded from the ridgelines of the mold by 5 mm each to outside on the whole.

To adapt the first base material 52 to the shape of the lower shaping mold 62, a thermoplastic adhesive (epoxy-modified thermoplastic resin, melting point 71° C.) had been applied to the first base material 52 beforehand.

Figure 19:
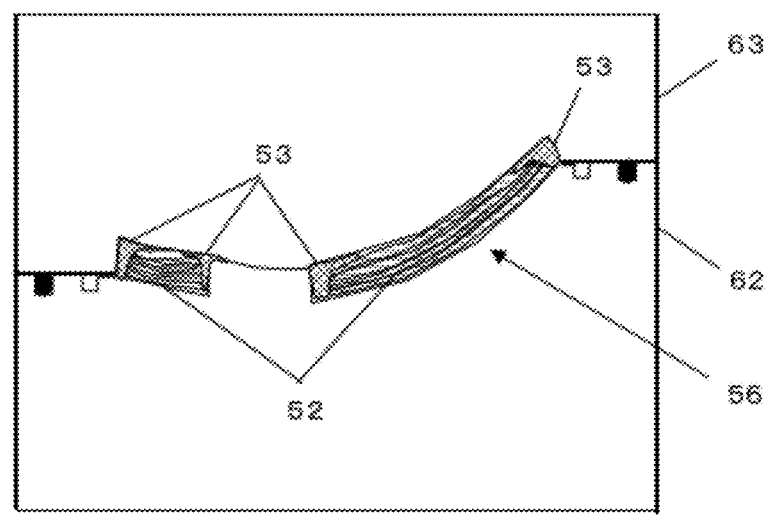
FIG. 19 is a vertical sectional view showing a state where the shaping mold of FIG. 18 is closed.

The upper shaping mold 63 was brought into contact with the lower shaping mold 62, and while the base materials were adapted to the shape of the mold, the shaping mold was heated to a temperature of 90° C. and kept in the state for about 10 minutes. Then, the shaping mold was quickly cooled, and the base materials were taken out of the shaping mold. The molding precursor 56 obtained here, in which the first base material 52 comprising four sheets of the base material B2 and the second base material 53 comprising the base material B3 were integrated, is shown in FIG. 19.

A molded product was produced according to the same method as that of Example 1, except that the obtained molding precursor 56 was used. Around the obtained molded product, thin burrs comprising the base material B3 and the epoxy resin were formed.

The burrs were removed by a simple deburring tool and a sanding tool. The deburring was completed in about 1 minute, and the burrs could be removed easily. A large-scale equipment for water jet machining, NC machining or the like was not necessary, and a simple deburring tool could be used for finishing the molded product.

Example 11

Figure 20:
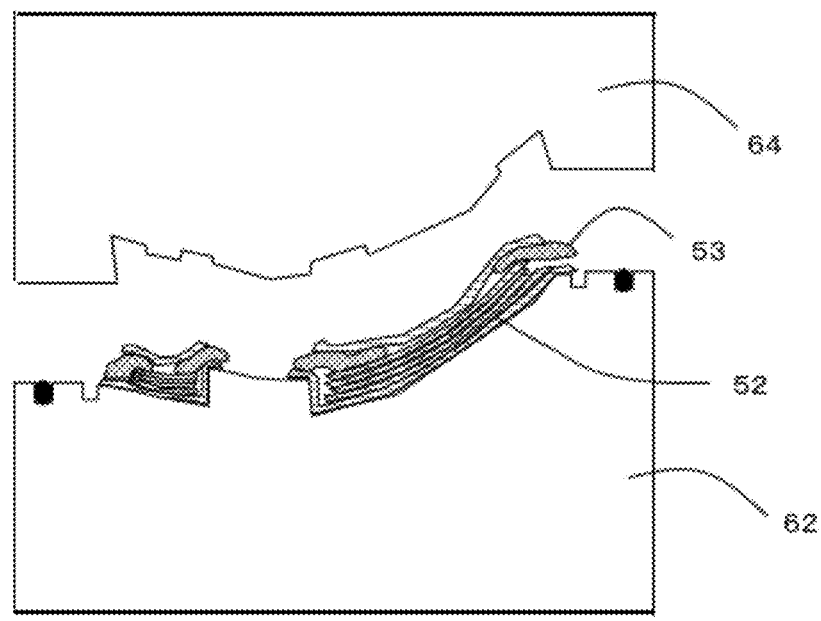
FIG. 20 is a vertical sectional view showing a shaping mold used for preparing a further other example of the molding precursor.

As shown in FIG. 20, one sheet of the base material B1 cut to be larger than the mold shape in width by 5 mm on each side and five sheets of the base material B1 cut to be smaller than the mold shape in width by about 5 mm on each side were prepared as the first base material 52. The one sheet of the base material B1 cut to be larger was disposed in the bottom force 62 of a shaping mold. Then, the four sheets of the base material B1 cut to be smaller were disposed on it in the lower shaping mold 62. As the second base material 53, the base material B7 was disposed to overlie on the first base material 52, in such a manner that it filled the vacancies between the first base material and the mold shape and also protruded from the ridgelines of the mold by 5 mm each to outside on the whole. Further on it, the remaining one sheet of the base material B1 was overlapped.

To adapt the first base material 52 to the shape of the lower shaping mold 62, a thermoplastic adhesive (epoxy-modified thermoplastic resin, melting point 71° C.) had been applied to the first base material 52 beforehand.

Figure 21:
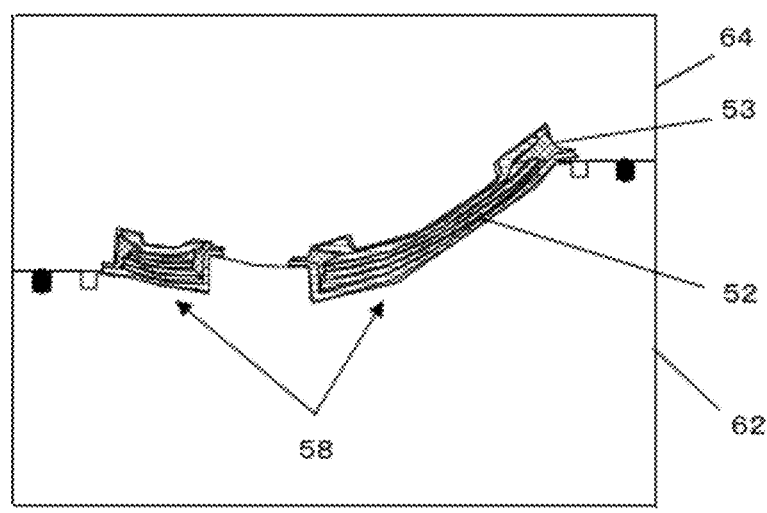
FIG. 21 is a vertical sectional view showing a state where the shaping mold of FIG. 20 is closed.

The upper shaping mold 64 was brought into contact with the lower shaping mold 62, and while the base materials were adapted to the mold shape, the shaping mold was heated to a temperature of 90° C. and kept in the state for about 10 minutes. Then, the shaping mold was quickly cooled, and the base materials were taken out of the shaping mold. The molding precursor 58 obtained here, in which the first base material 52 comprising five sheets of the base material B1 and the second base material 53 comprising the base material B7 were integrated, is shown in FIG. 21.

Figure 22:
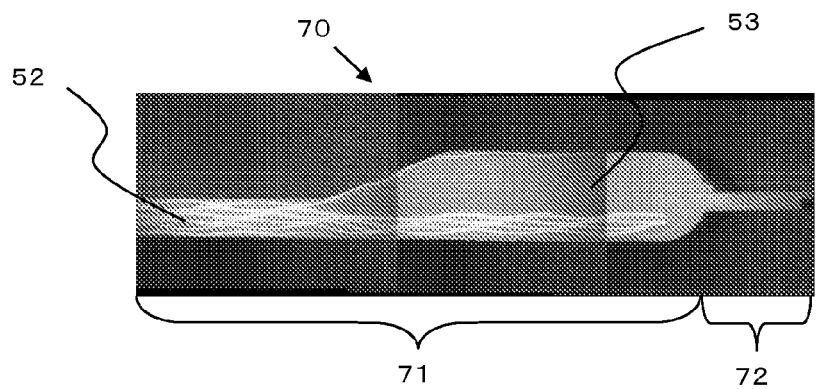
FIG. 22 is a sectional photograph showing the end portion of a further other example of the molded product.

A molded product was produced according to the same method as that of Example 5, except that the obtained molding precursor 58 was used. As shown in FIG. 22, the obtained molded product 70 had a main body portion 71 and burr forming portions 72 extending from the edge of the main body portion. The molded product 70 comprised the first base material 52 and the second base material 53 respectively impregnated with the resin, and around them, formed were thin burrs comprising the one sheet of the base material B1 cut to be larger, the base material B7 and the epoxy resin.

The burrs were removed by a simple deburring tool and a sanding tool. The deburring was completed in about 2 minutes, and the barrs could be removed easily. A large-scale equipment for water jet machining, NC machining or the like was not necessary, and a simple deburring tool could be used to finish the molded product.

Example 12

Figure 32:
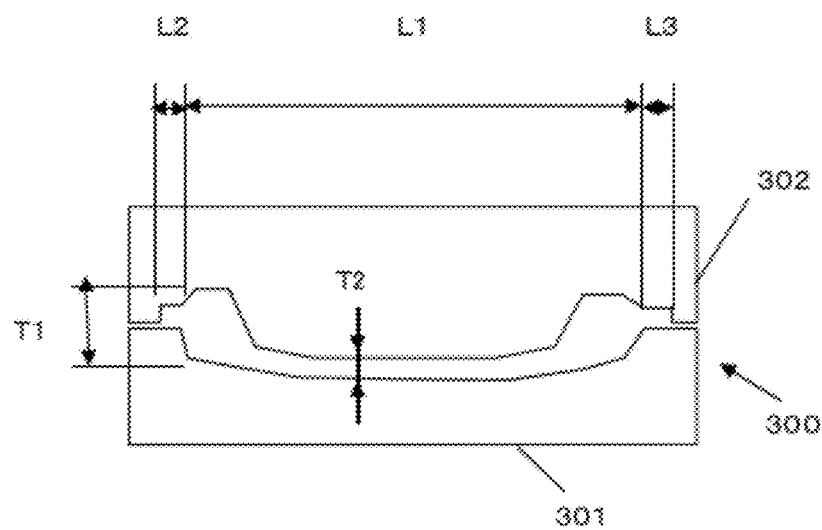
FIG. 32 is a vertical sectional view showing a shaping mold used for preparing a further other example of the molding precursor.

As shown in FIG. 32, prepared was a shaping mold 300 having a height T1 of 3 mm for the swelling portion on the entire circumference, a length L1 of 500 mm for the main body portion, a length L2 of 20 mm for the left portion, a length L3 of 20 mm for the right portion, a height T2 of 1.8 mm for the main body portion in the cross sectional form of the molding cavity. The shaping mold 300 comprised a lower shaping mold 301 and an upper shaping mold 302.

A base material comprising two sheets of the base material B11 laminated with fiber orientation directions of (0/90)/(±45) was prepared as the first base material. The first base material was cut with a pattern of about 10 mm longer on each side than the length L1 of the main body portion of the lower shaping mold 301 shown in FIG. 32. Then, a simple-layer base material comprising one sheet of the base material B6 was prepared as the second base material. The second base material was cut with a pattern of 18 mm longer on each side than the length L1 of the main body portion of the lower shaping mold 301. Further, a base material comprising two sheets of the base material B11 laminated with fiber orientation directions of (±45)/(0/90) was prepared as the third base material. The third base material was cut with a pattern of about 5 mm shorter than the length L1 of the main body portion of the lower shaping mold 301. The compressive characteristic value of the base material B6 was 47.3%.

The first to third base materials were laminated in the order of the first material/the second material/the third material, and disposed in the lower shaping mold 301, and the upper shaping mold 302 was closed. The shaping mold 300 had been conditioned to a temperature of 100° C., and the mold was kept closed for 5 minutes. The mold was opened, and the molding precursor was taken out.

Then, the obtained molding precursor was set in a lower mold of a mold having almost the same cross sectional form as that of FIG. 32, though the mold is not shown in the drawing, and an upper mold of the mold was closed. The mold had been kept at a temperature of 100° C., and in this state, the resin MR1 was injected into the mold using a resin injector not shown in the drawing. After completion of resin injection, the mold was kept in the state for 15 minutes. Then, the mold was opened, and the molded product was taken out of the mold.

It was confirmed that in the obtained molded product, oriented fibers existed also in the swelling portion having height T1 formed in the entire circumference and that no resin-rich portion was formed at all.

Since the burr portions formed around the molded product immediately after completion of production were of a thin FRP comprising the first base material, the second base material and the resin, a simple deburring tool and a sanding tool were used for deburring. The deburring was completed in about 2 minutes, and the burrs could be removed easily. It was not necessary to use a larges-scale equipment for water jet machining, NC machining or the like, and the molded product could be easily processed for finishing.

Example 13

A molded product was produced according to the same method as that of Example 12, except that one sheet of the base material B11 with fiber orientation directions of (0/90) as the first base, one sheet of the base material B7 as the second base material and one sheet of the base material B11 with fiber orientation directions of (0/90) as the third base material were used. The compressive characteristic value of the base material B7 was 39.3%.

In the obtained molded product, it was confirmed that oriented fibers existed in the swelling portion having height T1 formed in the entire circumference and that few resin-rich portions existed.

Since the burr portions formed around the molded product immediately after completion of production were of a thin FRP comprising the first base material, the second base material and the resin, a simple deburring tool and a sanding tool were used for deburring. The deburring was completed in about 1 minute and 20 seconds, and the burrs could be removed easily. It was not necessary to use a larges-scale equipment for water jet machining, NC machining or the like, and the molded product could be easily processed for finishing.

Example 14

Figure 33:
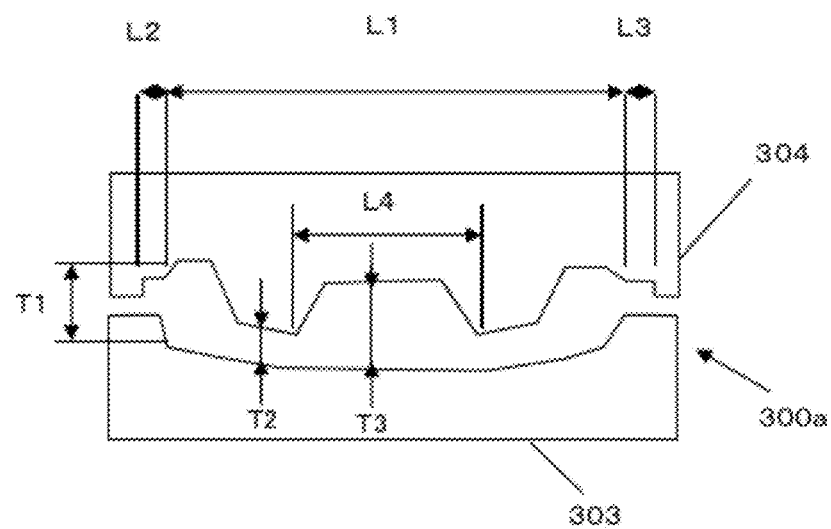
FIG. 33 is a vertical sectional view showing a shaping mold used for preparing a further other example of the molding precursor.

As shown in FIG. 33, prepared was a shaping mold 300a having a height T1 of 5 mm for the swelling portion on the entire circumference, a length L1 of 500 mm for the main body portion, a length L2 of 20 mm for the left portion, a length L3 of 20 mm for the right portion, a length L4 of 300 mm for the central portion of the main body portion, a height T2 of 2.6 mm for the intermediate portion of the main body portion, and a height T3 of 9 mm for the central portion of the main body portion in the cross sectional form of the molding cavity.

A base material comprising two sheets of the base material B21 laminated with fiber orientation directions of (0/90)/(±45) was prepared as the first base material. The first base material was cut with a pattern of about 10 mm longer on each side than the length L1 of the main body portion of the lower shaping mold 303 shown in FIG. 33. Then, a two-layer base material comprising two sheets of the base material B6 was prepared as the second base material. The second base material was cut with a pattern of about 3 mm longer on each side than the length L1 of the main body portion of the lower shaping mold 303. Further, a base material comprising two sheets of the base material B21 laminated with fiber orientation directions of (±45)/(0/90) was prepared as the third base material. The third base material was cut with a pattern of about 5 mm shorter than the length L1 of the main body portion of the lower shaping mold 303. The compressive characteristic value of the base material B6 was 47.3%.

Figure 34:
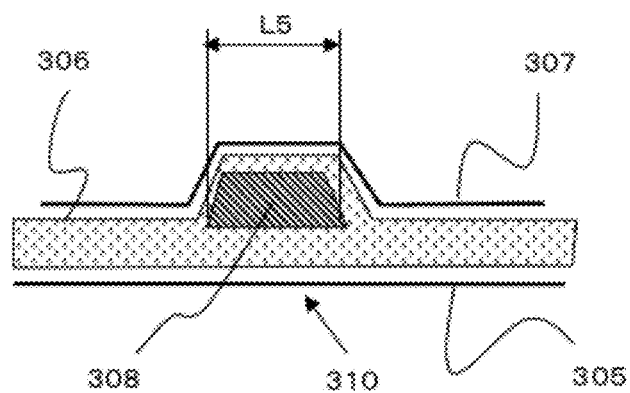
FIG. 34 is a vertical sectional typical view showing a further other example of the molding precursor.

The first to third base materials were laminated in the order of the first base material 305/the second base material 306/the third base material 307, and a core 308 comprising the core C1 was disposed as shown in FIG. 34. The core 308 had a length L5 of 290 mm.

The obtained laminate 310 was disposed on the lower shaping mold 303, and the upper shaping mold 304 was closed. The shaping mold 300a had been conditioned to a temperature of 100° C., and it was kept closed for 5 minutes. Then, the mold was opened, and the molding precursor was taken out.

Subsequently, the obtained molding precursor was set in a lower mold of a mold having almost the same cross sectional form as that of FIG. 33, though the mold is not shown in the drawing, and an upper mold of the mold was closed. The mold had been kept at a temperature of 100° C., and in this state, the resin MR1 was injected into the mold using a resin injector not shown in the drawing. After completion of resin injection, the mold was kept in that state for 15 minutes, and the mold was opened, the molded product being taken out of the mold.

In the obtained molded product, it was confirmed that oriented fibers existed in the swelling portion having height T1 formed in the entire circumference and that very few resin-rich portions existed. The fibers around the core 308 were also oriented well, and it was confirmed that no resin-rich portion existed around it at all.

Since the burr portions formed around the molded product immediately after completion of production were of a thin FRP comprising the first base material, the second base material and the resin, a simple deburring tool and a sanding tool were used for deburring. The deburring was completed in about 2 minutes, and the burrs could be removed easily. It was not necessary to use a larges-scale equipment for water jet machining, NC machining or the like, and the molded product could be processed for finishing.

Comparative Example 1

A base material comprising reinforcing fibers obtained by laminating four sheets of the base material B1 was prepared. The base material was cut to have the mold shape, and disposed in the lower shaping mold in layers.

To adapt the base material comprising reinforcing fibers to the shape of the lower shaping mold, a thermoplastic adhesive (epoxy-modified thermoplastic resin, melting point 71° C.) had been applied to the base material comprising reinforcing fibers beforehand.

The upper shaping mold was brought into contact with the lower shaping mold, and while the base material was adapted to the mold shape, the shaping mold was heated to a temperature of 90° C. and kept in the state for about 10 minutes. Then, the shaping mold was quickly cooled, and the base material was taken out of the shaping mold. A molding precursor in which four sheets of the base material B1 were integrated could be obtained.

The obtained molding precursor was disposed in a mold, and a molded product was produced according to the same method as that of Example 1. Around the obtained molded product, thin burrs composed of the base material comprising reinforcing fibers and the resin were formed.

Since the burrs were of a highly strong FRP composed of the base material comprising reinforcing fibers and the resin, it was difficult to remove the burrs using a simple deburring tool and a sanding tool alone. For finishing the molded product, NC machining was necessary.

Comparative Example 2

A base material comprising reinforcing fibers obtained by laminating four sheets of the base material B1 was prepared. The base material comprising reinforcing fibers was cut to be smaller than the mold shape in width by about 5 mm on each side, and they were disposed in the lower shaping mold in layers.

To adapt the base material comprising reinforcing fibers to the shape of the lower shaping mold, a thermoplastic adhesive (epoxy-modified thermoplastic resin, melting point 71° C.) had been applied to the base material comprising reinforcing fibers.

The upper shaping mold was brought into contact with the lower shaping mold, and while the base material was adapted to the mold shape, the shaping mold was heated to a temperature of 90° C. and kept in that state for about 10 minutes. Then, the shaping mold was quickly cooled, and the base material was taken out of the shaping mold. Thus, the base material comprising reinforcing fibers in which four sheets of the base material B1 were integrated could be obtained as a molding precursor.

Figure 2:
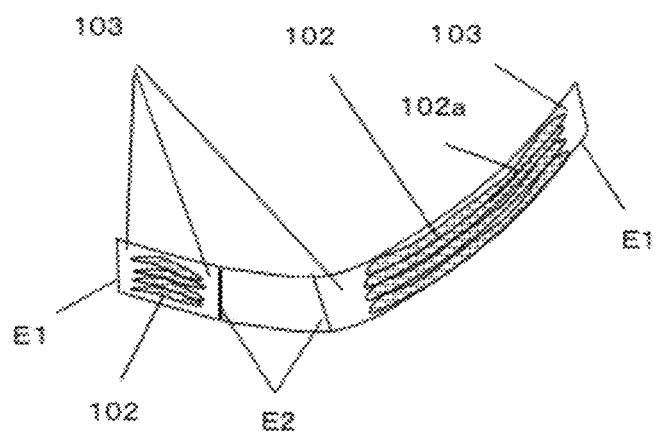
FIG. 2 is the A-A sectional view of the molded product of FIG. 1.
Figure 3:
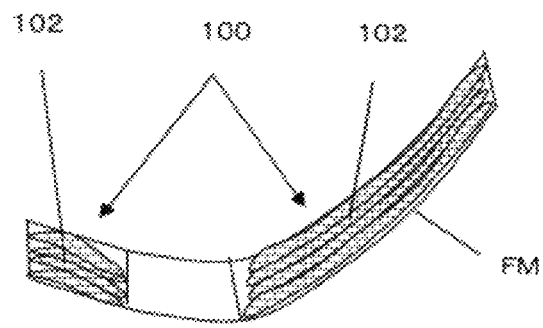
FIG. 3 is a vertical sectional view showing another conventional molded product.

The obtained molding precursor was disposed in a mold, and a molded product was produced by the same method as that of Example 1. It was confirmed that resin-rich portions 103 free from the base material comprising reinforcing fibers as shown in FIG. 2 existed at the hems of the obtained molded product. The molded product did not have the desired strength.

Comparative Example 3

A molded product was produced according to the same method as that of Example 12, except that a base material having two sheets of the base material B11 laminated with fiber orientation directions of (0/90)/(±45) was used as the second base material. Meanwhile, the compressive characteristic value of the base material B11 was 26.8%.

The obtained molded product had portions where the resin only existed, and it was confirmed that the swelling portion having height T1 formed in the entire circumference had resin-rich portions where fibers were not sufficiently oriented.

The burrs around the molded product were removed by a simply deburring tool and a sanding tool. The deburring was completed in about 1 minute, and the burrs could be removed easily. However, the obtained molded product was cracked or chipped in the swelling portion.

INDUSTRIAL APPLICABILITY

We provide an FRP structure in which reinforcing fibers are desired to be disposed up to every corner, especially a thin FRP sheet required to have strength at its hems, a production process thereof, and a molding precursor used for producing the FRP structure. The molding precursor can be applied not only to the FRP production process by the RTM method using an epoxy resin but also to the FRP production process by impregnating another molding precursor with a flowing resin. The molding precursor, the process for producing a molded fiber-reinforced resin, and the molded fiber-reinforced resin, respectively, can be applied to automobile parts (outside sheets and structural members), aircraft members (primary and secondary structural materials, interior materials, reinforcing members), ship members, windmill blades, architectural panels, other general industrial members or the like.

The invention claimed is:

1. A molded fiber-reinforced resin composed of a matrix resin and a reinforcing fiber base material comprising numerous reinforcing fibers, wherein clearances among said numerous reinforcing fibers are impregnated with said matrix resin, and wherein the reinforcing fiber base material is a first base material; a second base material comprising numerous fibers is laminated on said first base material at an outer edge portion of said first base material; the strength of the fibers forming said second base material is lower than the strength of the reinforcing fibers forming said first base material; and clearances among said numerous fibers forming said second base material are also impregnated with said matrix resin, wherein said molded fiber-reinforced resin comprises a main body portion and a burr forming portion, and wherein said main body portion is formed with at least said first base material impregnated with said matrix resin, and said burr forming portion is formed with at least said second base material impregnated with said matrix resin.

2. The molded fiber-reinforced resin according to claim 1, wherein said first base material is disposed to at least partially cover said second base material positioned at said outer edge portion.

3. The molded fiber-reinforced resin according to claim 1, wherein said first base material is disposed to at least partially hold said second base material positioned at said outer edge portion.

4. The molded fiber-reinforced resin according to claim 1, wherein a core base material comprising foam covered with said first base material is disposed at a central portion of said first base material.

5. The molded fiber-reinforced resin according to claim 1, wherein a third base material comprising numerous reinforcing fibers is laminated on said first base material and said second base material, said second base material has a form almost identical with that of said first base material and is disposed between said first base material and said third base material, and a three-layer structure comprising said first base material, said second base material and said third base material is formed.

6. The molded fiber-reinforced resin according to claim 5, wherein a core base material comprising foam is disposed in contact with said second base material.

7. The molded fiber-reinforced resin according to claim 1, wherein the unit weight of said first base material is about 100 to about 1000 g/m$^2$.

8. The molded fiber-reinforced resin according to claim 5, wherein the unit weight of said third base material is about 100 to about 1000 g/m$^2$.

9. The molded fiber-reinforced resin according to claim 1, wherein said second base material is a nonwoven fabric.

10. The molded fiber-reinforced resin according to claim 1, wherein the unit weight of said second base material is about 10 to about 1500 g/m$^2$.

11. The molded fiber-reinforced resin according to claim 1, wherein the thickness of the outer edge portion is about 1.5 to about 5 times the thickness of the central portion.

\* \* \* \* \*